(12) United States Patent
Yamazaki et al.

(10) Patent No.: US 7,068,254 B2
(45) Date of Patent: Jun. 27, 2006

(54) USER IDENTITY AUTHENTICATION SYSTEM AND USER IDENTITY AUTHENTICATION METHOD AND MOBILE TELEPHONIC DEVICE

(75) Inventors: Shunpei Yamazaki, Tokyo (JP); Jun Koyama, Kanagawa (JP); Yasuyuki Arai, Kanagawa (JP); Hideomi Suzawa, Kanagawa (JP); Koji Ono, Kanagawa (JP); Toru Takayama, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 370 days.

(21) Appl. No.: 09/851,415

(22) Filed: May 9, 2001

(65) Prior Publication Data
US 2002/0052192 A1 May 2, 2002

(30) Foreign Application Priority Data
May 9, 2000 (JP) .............................. 2000-135486

(51) Int. Cl.
*G06K 9/00* (2006.01)
(52) U.S. Cl. ..................... 345/104; 345/102; 349/50; 382/115; 382/124
(58) Field of Classification Search ................ 345/48, 345/55, 84, 87, 102, 104, 507, 572; 455/92, 455/550, 552, 566, 575; 349/50, 51; 209/217, 209/218, 219; 385/115; 709/218, 219; 382/115, 382/124
See application file for complete search history.

(56) References Cited

U.S. PATENT DOCUMENTS

| | | | |
|---|---|---|---|
| 4,993,068 A | 2/1991 | Piosenka et al. | |
| 5,280,527 A | 1/1994 | Gullman et al. | |
| 5,764,789 A | 6/1998 | Pare, Jr. et al. | |
| 5,845,016 A * | 12/1998 | Matsui et al. | 382/253 |
| 5,966,112 A * | 10/1999 | Katagiri et al. | 345/104 |
| 6,028,581 A * | 2/2000 | Umeya | 345/104 |
| 6,070,796 A * | 6/2000 | Sirbu | 235/382 |
| 6,219,793 B1 | 4/2001 | Li et al. | |
| 6,243,155 B1 | 6/2001 | Zhang et al. | |
| 6,327,376 B1 * | 12/2001 | Harkin | 382/124 |
| 6,445,932 B1 * | 9/2002 | Soini et al. | 455/556.1 |

(Continued)

FOREIGN PATENT DOCUMENTS

DE    19809006    9/1999

(Continued)

OTHER PUBLICATIONS

European Search Report, , EP 01 11 1375, Feb. 2, 2004.

(Continued)

*Primary Examiner*—Amr A. Awad
*Assistant Examiner*—Vincent E. Kovalick
(74) *Attorney, Agent, or Firm*—Fish & Richardson P.C.

(57) ABSTRACT

It is an object to provide an user identity authentication system and an user identity authentication method with the Internet and a mobile information communication device. The mobile information communication device includes a liquid crystal device with a built-in image sensor. The image sensor reads individual information of a user, and user's identity is authenticated based on the individual information. A result of the authentication is unicast via the Internet. Alternatively, it is judged whether or not the result of the authentication is required to be unicast in accordance with a degree of requirement preset in the mobile information communication device or a destination terminal of communication, and the result is unicast via the Internet only when needed.

40 Claims, 20 Drawing Sheets

U.S. PATENT DOCUMENTS

| | | | |
|---|---|---|---|
| 6,456,279 B1 * | 9/2002 | Kubo et al. | 345/173 |
| 6,476,374 B1 * | 11/2002 | Kozlowski et al. | 250/214.1 |
| 6,484,260 B1 * | 11/2002 | Scott et al. | 713/186 |
| 6,539,101 B1 * | 3/2003 | Black | 382/124 |
| 6,587,873 B1 * | 7/2003 | Nobakht et al. | 709/219 |
| 6,594,505 B1 * | 7/2003 | Ishii | 455/552 |
| 6,657,538 B1 | 12/2003 | Ritter | |
| 2001/0030704 A1 | 10/2001 | Kimura | |
| 2001/0031074 A1 | 10/2001 | Yamazaki et al. | |
| 2001/0047479 A1 | 11/2001 | Bromba et al. | |
| 2002/0001400 A1 | 1/2002 | Yamazaki et al. | |
| 2002/0011972 A1 | 1/2002 | Yamazaki et al. | |

FOREIGN PATENT DOCUMENTS

| | | |
|---|---|---|
| DE | 20008345 | 8/2000 |
| EP | 0593386 | 4/1994 |
| EP | 0986209 | 3/2000 |
| EP | 1148446 | 10/2001 |
| GB | 2312040 | 10/1997 |
| GB | 2 348 309 | 9/2000 |
| JP | 06-186585 | 12/1992 |
| JP | 11-203041 | 7/1999 |
| JP | 11-345264 | 12/1999 |
| JP | 2000-276445 | 10/2000 |
| JP | 2001-5945 | 1/2001 |
| WO | WO-98-11750 | 3/1998 |
| WO | WO-98-40962 | 9/1998 |
| WO | WO-98-50875 | 11/1998 |
| WO | WO-99-24938 | 5/1999 |
| WO | WO-00-17823 | 9/1999 |
| WO | WO-99-28701 | 10/1999 |

OTHER PUBLICATIONS

Kim, Hyun-Jung, "Biometrics, Is it a Viable Proposition for Identity Authentication and Access Control?", Computer Security Research Centre, vol. 14, No. 3, pp. 205-214), Jan. 1, 1995.

Kobayashi, Tetsuji, A Fingerprint Image Recognition Method for Network User Identification, Nippon Telegraph and Telephone Corporation, pp. 369-372, May 28, 1992.

Stockel, Anna, "Securing Data and Financial Transactions", Identix Incorporated, pp. 397-401, Oct. 18, 1995.

Office Action (application No. 01 111 375.0; EP4906), dated Dec. 27, 2004.

* cited by examiner

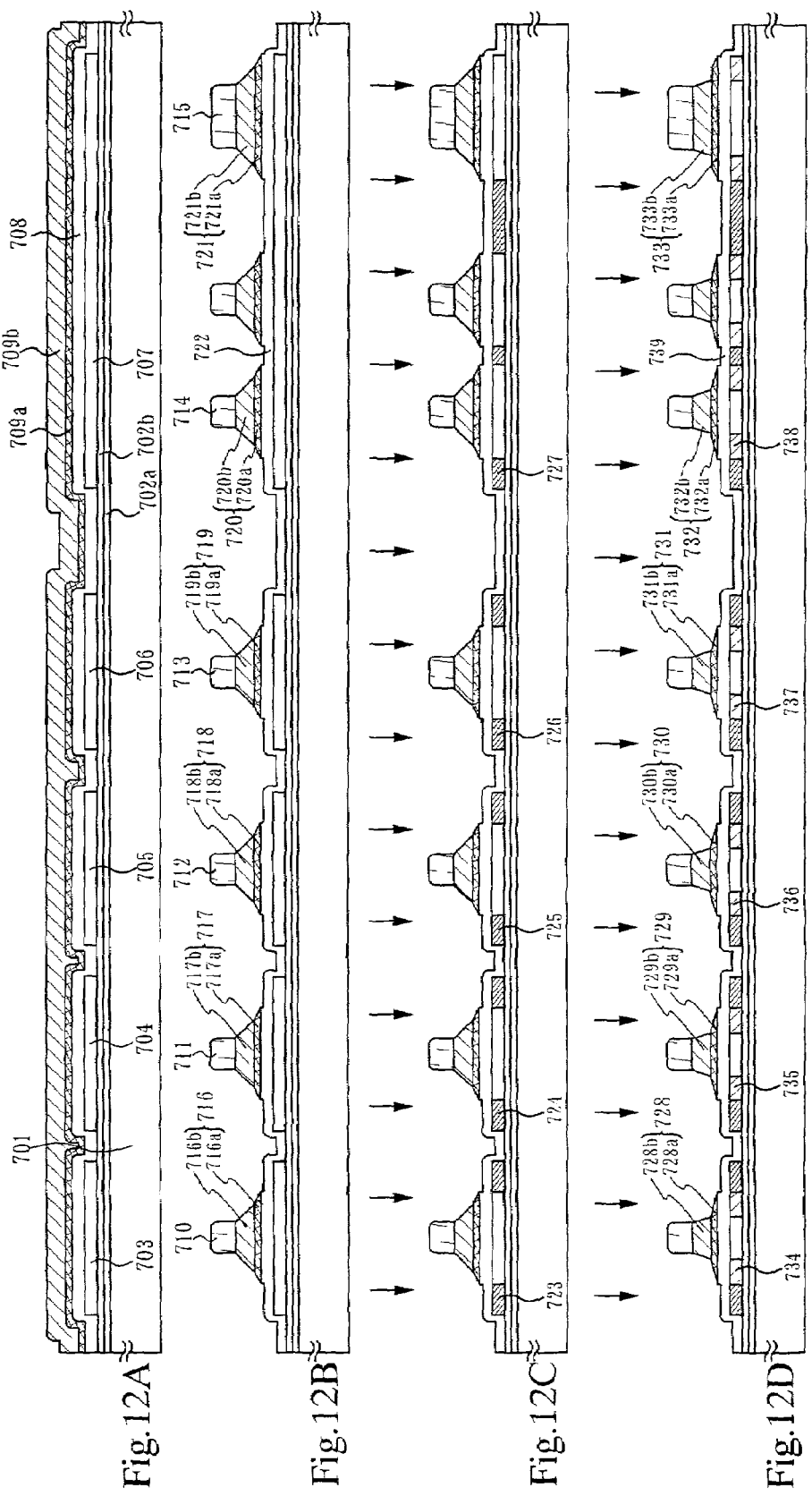

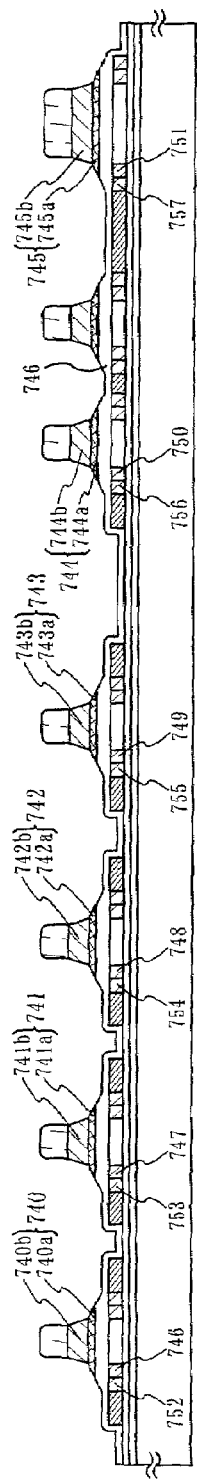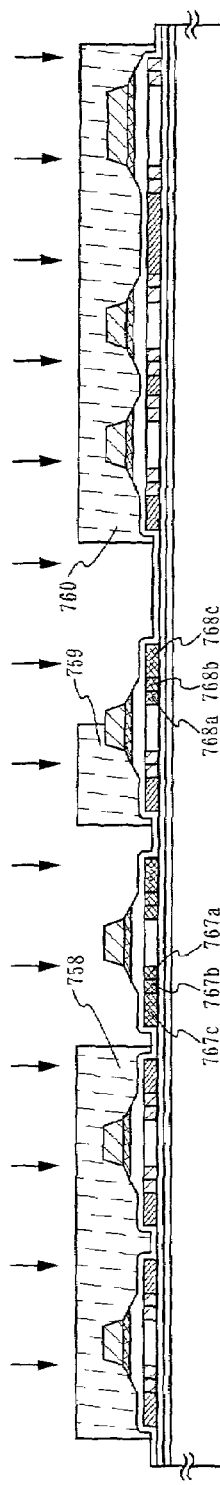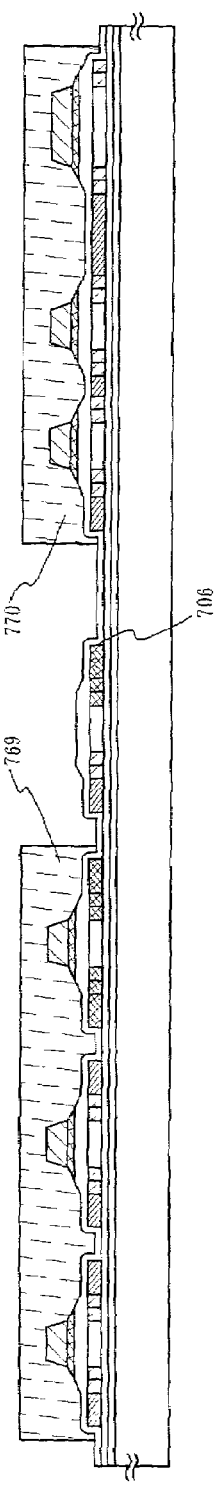

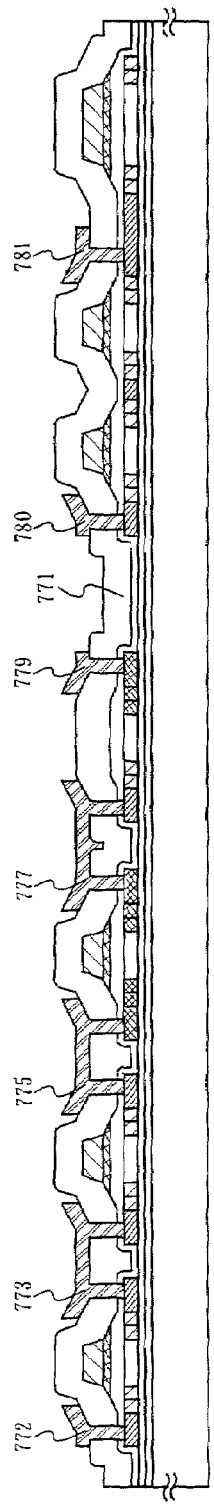
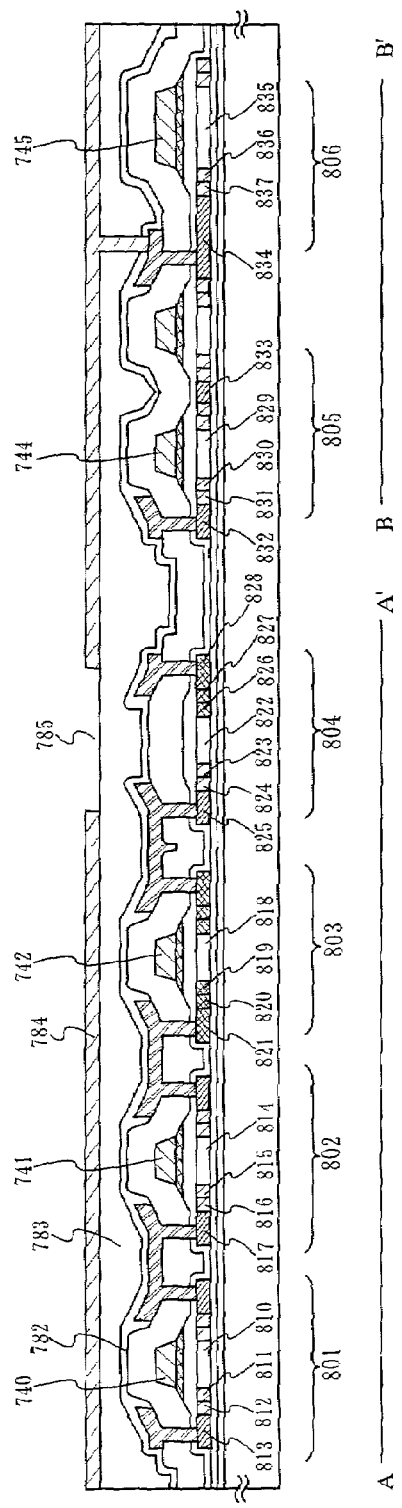
Fig.14A
Fig.14B

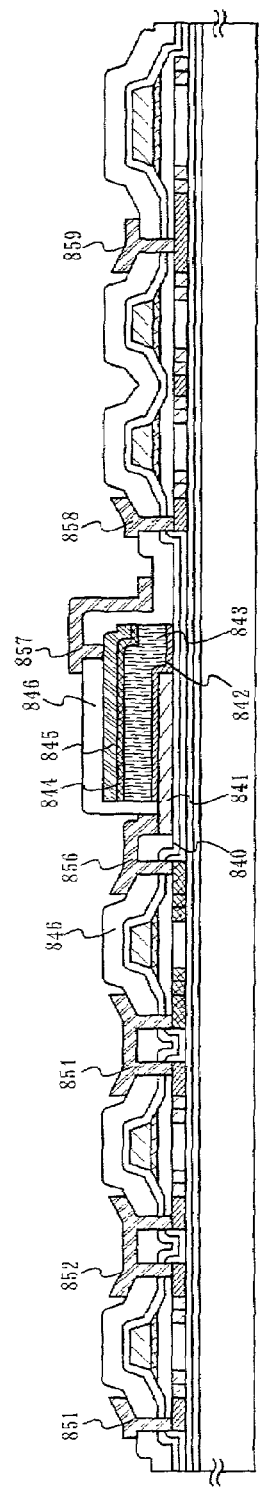
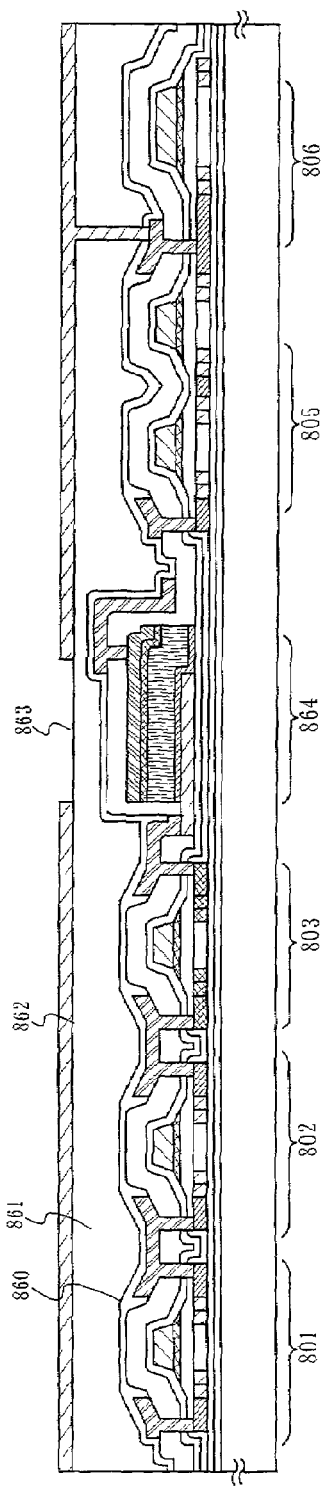
Fig.16A
Fig.16B

USER IDENTITY AUTHENTICATION SYSTEM AND USER IDENTITY AUTHENTICATION METHOD AND MOBILE TELEPHONIC DEVICE

BACKGROUND OF THE INVENTION

1. Field of the Invention

The present invention relates generally to a user identity authentication system and a user identity authentication method. More particularly, the present invention relates to a user identity authentication system and a user identity authentication method of authenticating a user's identity with use of an image sensor built-in type liquid crystal display device incorporated into a mobile information communication device.

2. Description of the Related Art

The Internet-based communication technologies using mobile information communication devices such as mobile telephones, handheld information terminals, have been rapidly developing for recent years. A main conventional communication system in the Internet is performed by connecting telephone lines to desktop personal computers in offices and homes. Recently, however, there has been spreading such a system that the mobile telephones are connected to the Internet, and a variety of information is readily exchanged.

FIG. 18 shows an example of the conventional mobile telephone device. The conventional mobile telephone device shown in FIG. 18 is constructed of a main body 1801, a voice output unit 1802, a voice input unit 1803, a display unit 1804, an operation switch 1805 and an antenna 1806. In the case of giving a normal telephone call, a telephone number of a destination terminal and a receiving state of electric radio waves are displayed on a liquid crystal display. Further, in utilizing the Internet, a necessary item of information is displayed.

If money is transferred and received on the Internet by use of the conventional mobile telephonic device shown in FIG. 18, it is required that a user's identity be authenticated. In this case, the authentication is carried out by inputting a password registered beforehand in the destination terminal and transferring and giving data to and receiving data from the destination terminal.

FIG. 19 shows a flow of the conventional user identity authentication. The user at first makes a connection to a desired destination terminal via the Internet. Next, under conditions specified by the destination terminal, a number (password) for authentication is inputted from the mobile telephonic device. The destination terminal which receives the number collates the received value with a beforehand registered number, and checks whether or not both of the numbers are coincident with each other. If coincident, the user's identity can be authenticated, a service desired can be received.

According to the conventional authentication system using the mobile telephone as described above, however, there arise the following problems. A first problem is that it is hard for the user's identity to be authenticate, and the password might be abused if it leaks to people except the user himself or herself. A second problem is that a communication cost rises because the user's identity is authenticated through the communications with the destination terminal every time, and a reconfirmation is needed if the communication is disconnected. A third problem is that inputting through a keyboard is time-consuming.

SUMMARY OF THE INVENTION

It is a primary object of the present invention to provide a user identity authentication system and a user identity authentication method using the Internet and a mobile information communication device in order to obviate the above problems.

To accomplish the above object, a user identity authentication system with a mobile information communication device comprising a liquid crystal display device, according to the first aspect of the present invention, is characterized in that an image sensor is built in the liquid crystal display device, that the image sensor reads individual information of a user, and that a user's identity is authenticated based on the read individual information.

According to the second aspect of the present invention, a user identity authentication system comprises a liquid crystal display device including a built-in image sensor, a storage device, and a module for comparing individual information read by the image sensor with individual information stored in the storage device.

According to a third aspect of the present invention, a user identity authentication system comprises a liquid crystal display device including a built-in image sensor, a storage device, and a module for judging whether the user can be identified or not by comparing individual information read by the image sensor with individual information stored in the storage device.

According to a fourth aspect of the present invention, a user identity authentication system is characterized in that the image sensor reads individual information of a user, the user's identity is authenticated, and the result of the authentication is transmitted via the Internet.

According to a fifth aspect of the present invention, a user identity authentication system is characterized in that the image sensor reads individual information of a user, the user's identity is authenticated, and a transmission necessity of the result of the authentication is judged based on a degree of requirement set in the mobile information communication device or a destination terminal of communication, and the result of the authentication is transmitted via the Internet only when necessary.

According to a sixth aspect of the present invention, a user identity authentication method using a mobile information communication device provided with a liquid crystal display device including a built-in image sensor, comprises a step of reading individual information of a user with the built-in image sensor, and a step of authenticating a user's identity based on the individual information.

According to a seventh aspect of the present invention, there is provided a user identity authentication method in which the image sensor reads individual information of a user, and a user's identity is authenticated based on the individual information.

According to an eighth aspect of the present invention, there is provided a user identity authentication method in which the image sensor reads individual information of a user, and a transmission necessity of the individual information is judged based on a degree of requirement set in the mobile information communication device or a destination terminal of communication, and the individual information is transmitted via the Internet only when necessary.

An operation of authenticating the user's identity may be performed by manipulating an operation key on the mobile information communication device. The operation key can be controlled by only a dominant hand of the user or by only a forefinger of the user or by only a thumb of the user.

The authentication of the user's identity may be triggered simultaneously by switching on a power source of the mobile information communication device. A palm print (palm lines) or a fingerprint may be used as the individual information. The palm print of the whole or a part of the palm may be used. What is transmitted via the Internet may be only the result of the authentication, and the data for the authentication may not be transmitted. The image sensor may be a close-fitted type image sensor.

According to a ninth aspect of the present invention, a mobile telephonic device applied to the user identity authentication system described above, comprises an image sensor built-in type liquid crystal display device, a non-volatile memory or a rewritable non-volatile memory (flash memory), and a means for collating individual information read by the image sensor with user's individual information stored in the non-volatile memory.

According to the present invention, in the liquid crystal display device with the built-in image sensor, the display portion for displaying information such as characters and images and the image sensor, are provided in the same portion, thereby downsizing the mobile information communication device.

BRIEF DESCRIPTION OF THE DRAWINGS

Other features and advantages of the present invention will become readily apparent from the following description taken in conjunction with the accompanying drawings, in which:

FIG. 12 is a diagram showing a process of manufacturing the image sensor built-in type display;

FIG. 13 is a diagram showing a process of manufacturing the image sensor built-in type display;

FIG. 14 is a diagram showing a process of manufacturing the image sensor built-in type display;

FIG. 16 is an explanatory diagram showing a process of forming a photo sensor by use of an amorphous silicon pin diode;

DETAILED DESCRIPTION OF THE PREFERRED EMBODIMENTS

Embodiment modes of a user identity authentication system of the present invention will hereinafter be described with reference to the accompanying drawings.

Embodiment Mode 1

Figure 1:
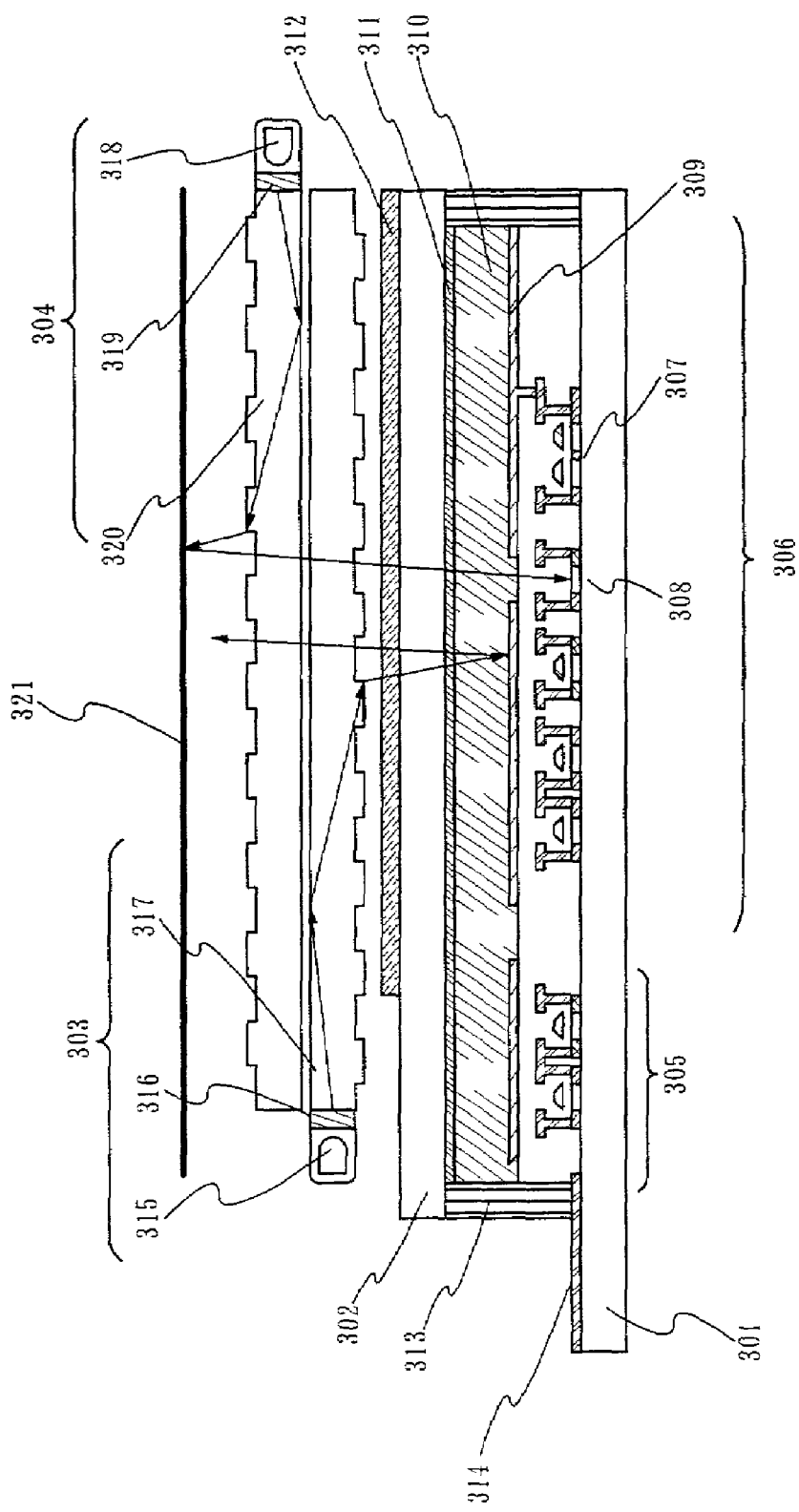
FIG. 1 is an explanatory diagram showing a structure of a reflection type liquid crystal display device incorporating an image sensor, an image display method and an image reading system.

FIG. 1 is a diagram showing a structure of a liquid crystal display device used for the user identity authentication system of the present invention. The liquid crystal display device is constructed of a substrate 301 (which will hereinafter be referred to as a TFT array substrate) formed with a pixel portion and a driver circuit which are formed with TFTs (Thin Film Transistors), an opposing substrate 302, a polarizing plate 312, a first front light 303 and a second front light 304. A liquid crystal layer 310 is provided between the TFT array substrate 301 and the opposing substrate 302 and sealed by a sealing member 313.

A low consumption of electric power is demanded for a mobile information communication device, and hence a reflection type liquid crystal display device for display by making use of the external light, is applied and involves the use of the front light as an auxiliary light source for enhancing a visual recognition in a dark place. Referring to FIG. 1, the first front light 303 provided on a front surface is corresponding to the auxiliary light source. The first front light 303 is constructed of a light source 315 composed of a cold cathode tube or a light emitting diode (LED), a diffusion plate 316, a light guide plate 317, and the like. Light radiated towards the liquid crystal layer 310 from the light guide plate 317 is reflected by a pixel electrode 309 towards the user side and then used.

A TFT array substrate 301 is formed with a pixel portion 306, a driver circuit portion 305 and an external input terminal 314. The pixel portion 306 is formed with a plurality of pixels arranged in matrix. Each pixel is provided with a pixel TFT 307 connected to the pixel electrode 309, and a photo diode 308. The photo diode 308 is two-dimensionally laid out, thus configuring an image sensor. Further, the opposing substrate 302 is formed with an opposing electrode 311.

A user's identity is authenticated by identifying a palm print (palm lines) or a fingerprint as individual information of the user. Information on a whole or a part of the palm print is obtained from the image sensor constructed of the photo diode 308 provided in the respective pixels. The second front light 304 is a light source for this image sensor. Light irradiated from the light source 318 composed of the cold cathode tube or the light emitting diode (LED) travel across the light guide plate 320 via the diffusion plate 319. A part of the light is radiated towards an individual surface 321 that should be identified, and the beams reflected from the individual surface 321 enter the photo diode 308.

As described above, the liquid crystal display device in this embodiment mode, shown as the reflection type liquid crystal display device with the use of two front lights, is capable of displaying an image and reading the individual information by the image sensor. In fact, the first and second front lights 303, 304 are not lit up simultaneously, and are operated alternately corresponding to a case of displaying the image and a case of reading the image.

Embodiment Mode 2

The individual information (on physical characteristics such as a fingerprint and a palm print inherent in the individual) absolutely unique to the user, is identified by the mobile information communication device itself, thereby gaining a more simplicity of the system.

Figure 2:
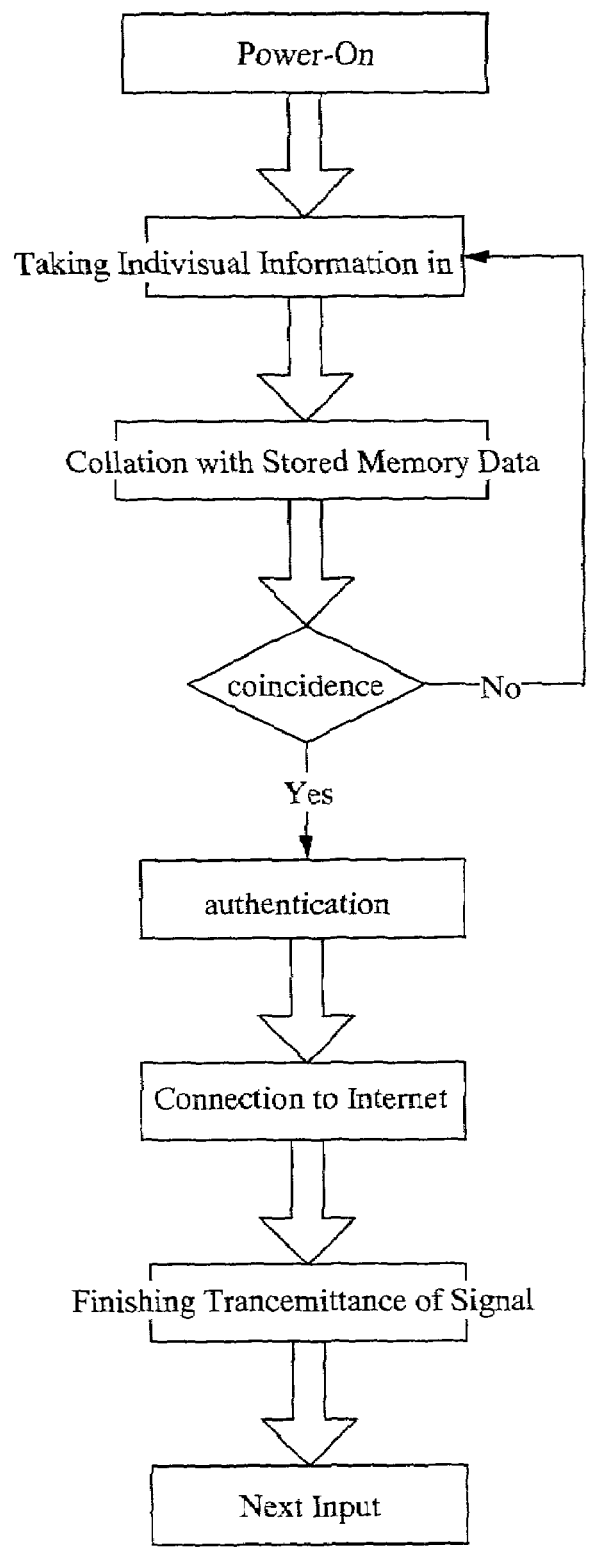
FIG. 2 is a flowchart showing a flow of authentication in a user identity authentication system of the present invention.

FIG. 2 shows a flow of the authentication by the user identity authentication system of the present invention. First, collecting individual information is indicated from a keyboard. If programmed beforehand, it is possible to easily start collecting the individual information simply by pressing a key. Further, an auto start of collecting the individual information may also be made at power-on of the mobile information communication device.

The individual information obtained is compared with the user's individual information previously stored in a non-volatile memory or a rewritable non-volatile memory (such as a flash memory) as a storage device in the mobile information communication device. Herein, if it is judged that two items of individual information are identical with each other, the user is judged to be the authentic owner of the mobile information communication device. After finishing the judgement as to whether the user can be identified or not, a result of the user authentication is transmitted to a destination terminal of the communication (the terminal demanding the authentication). The result of the user authentication is transmitted via the Internet or a wireless communication line. In this case, the operation for authenticating has already been finished, and hence there is no necessity of performing the operation for authenticating afresh with the destination terminal. The destination terminal may simply receive from the mobile information communication device such information that the authentication has been finished.

The mobile information communication device used for the user identity authentication system of the present invention has the image sensor within the liquid crystal display device. The image sensor is used for reading the individual information of the user. The individual information categorized herein may include specifically the finger print, the palm print (palm lines), and so on.

Figure 3:
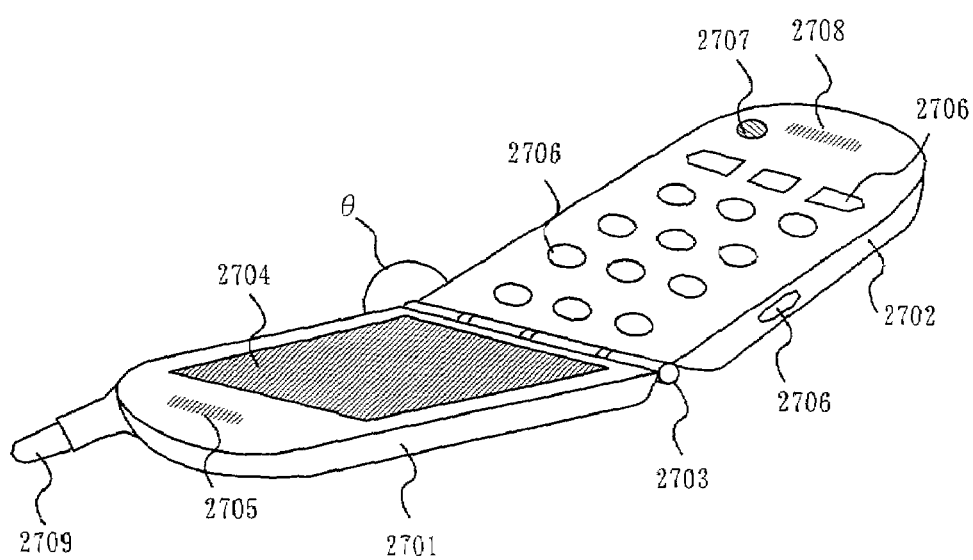
FIG. 3 is a view showing an external configuration of a mobile information communication device of the present invention.

Next, the mobile information communication device of the present invention will be explained. FIG. 3 shows the mobile information communication device of the present invention. The mobile information communication device is constructed of a display panel 2701, an operation panel 2702, and antenna 2709. The display panel 2701 and the operation panel 2702 are connected to each other at a connecting member 2703. Then, an angle è made by a surface, provided with a sensor built-in display 2704 of the display panel 2701, and by a surface, provided with an operation key 2706 of the operation panel 2702, can be arbitrarily changed.

The display panel 2701 includes the sensor built-in display 2704. Further, the mobile information communication device shown in FIG. 3 has a function as a telephone. The display panel 2701 includes a voice output unit 2705 for outputting voice. The sensor built-in display 2704 involves the use of reflection type liquid crystal display.

The operation panel 2702 has the operation key 2706, a power switch 2707 and a voice input unit 2708. Note that the operation key 2706 and the power switch 2707 are separately provided in FIG. 2, however, there may be taken a configuration in which the operation key 2706 incorporates the power switch 2707. The voices are inputted to the voice input unit 2708.

Note that the display panel 2701 has the voice output unit 2705, and the operation panel 2702 has the voice input unit 2708 in FIG. 3, however, the embodiment mode 2 is not limited to this configuration. The display panel 2701 may have the voice input unit 2708, while the operation panel 2702 may have the voice output unit 2705. Further, both of the voice output unit 2705 and the voice input unit 2708 may be provided together in the display panel 2701 or in the operation panel 2702.

Figure 4:
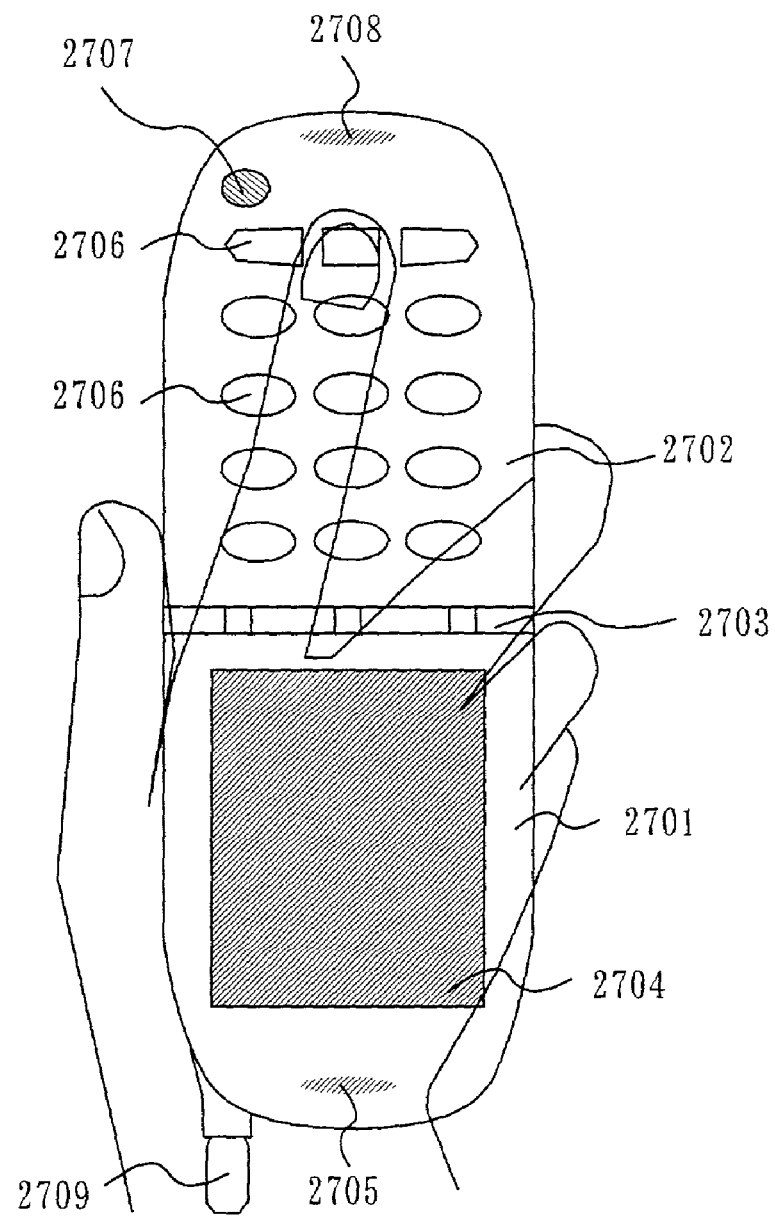
FIG. 4 is a view showing a method of how the mobile information communication device of the present invention is used.
Figure 20:
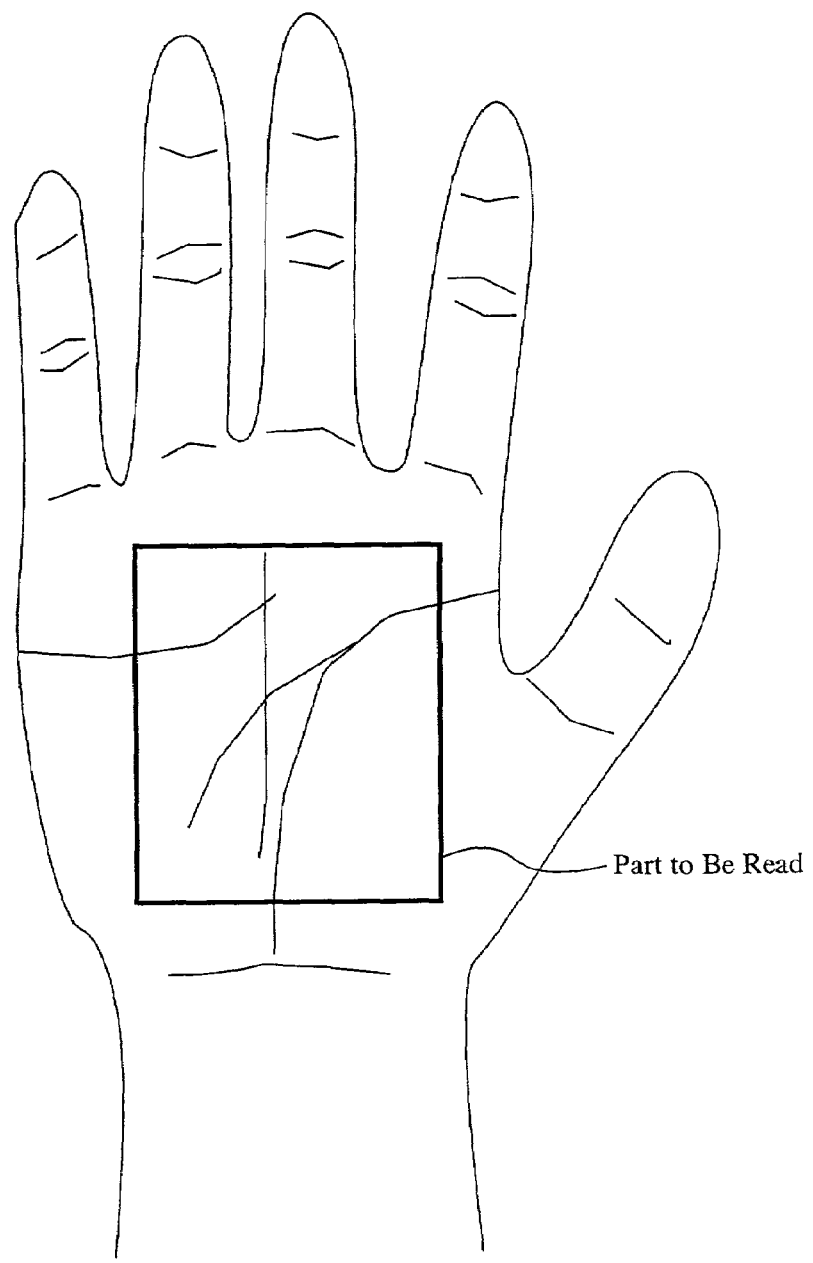
FIG. 20 is a view showing an area of a palm print to be read.

A method of using the mobile information communication device shown in FIG. 3 will be described referring to FIGS. 4 and 5. As shown in FIG. 4, when authenticating the user is performed with this mobile information communication device, the device is held by a hand to embrace the device with a palm. The operation for authenticating is conducted by manipulating a key on the keyboard, and reading a user's palm print as individual information with the image sensor built-in display. The authentication is attained by collating the individual information read by the image sensor with the individual information stored in the built-in non-volatile memory such as the flash memory. Herein, the mobile device is embraced by the palm, and it is therefore required that the light used for sensing be obtained from the display side. As illustrated in FIG. 20, the palm print (palm lines) is read by the image sensor.

Figure 5:
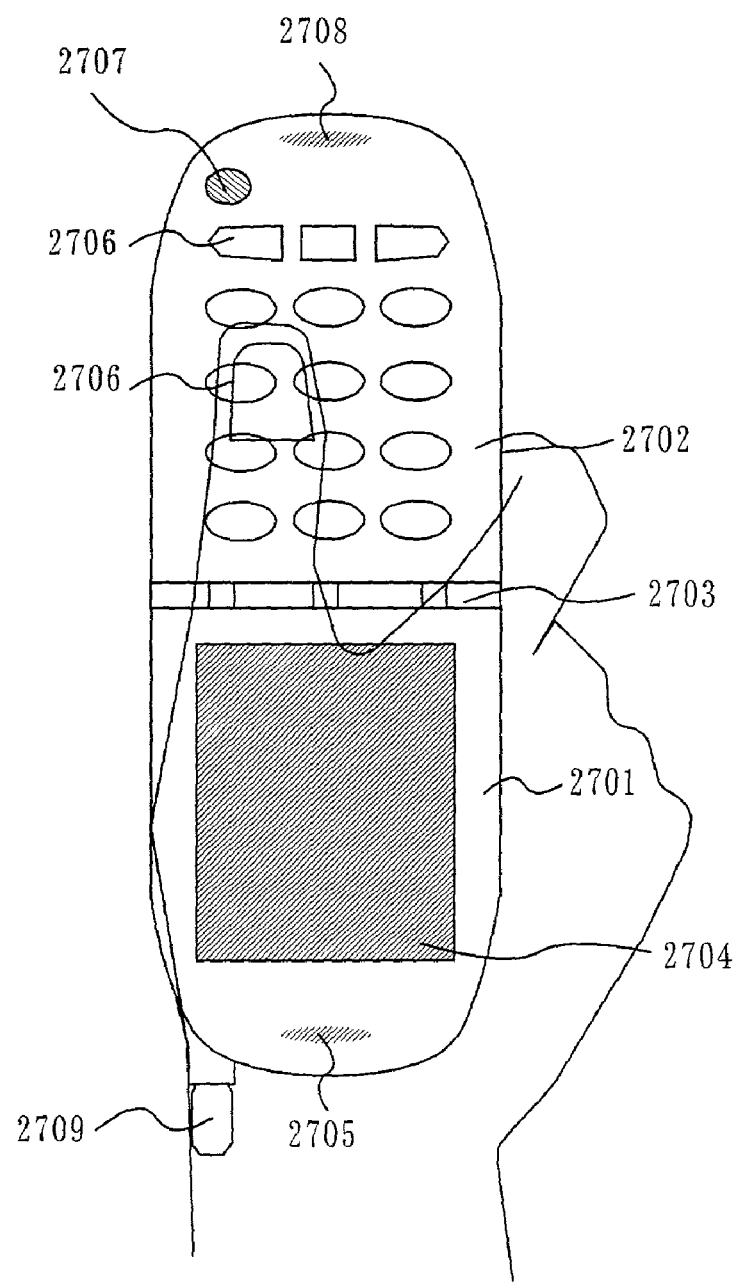
FIG. 5 is a view showing a method of how the mobile information communication device of the present invention is used.

Note that FIG. 4 shows the example in which the operation key 2706 is manipulated by a forefinger, however, the operation key 2706 can be manipulated by a thumb as illustrated in FIG. 5. It is also to be noted that the operation key 2706 may be provided on a side surface of the operation panel 2702. The manipulation can be done by only the forefinger or the thumb of the dominant hand.

As discussed above, the mobile information communication device shown in FIG. 3 can be utilized as a mobile telephonic device and has a characteristic that the information is taken in from outside through the image sensor built-in type display.

EMBODIMENTS

Embodiment 1

Configurations and operations of the mobile information communication device including the sensor built-in type display according to the present invention will be explained with Embodiments 1 to 8.

Figure 6:
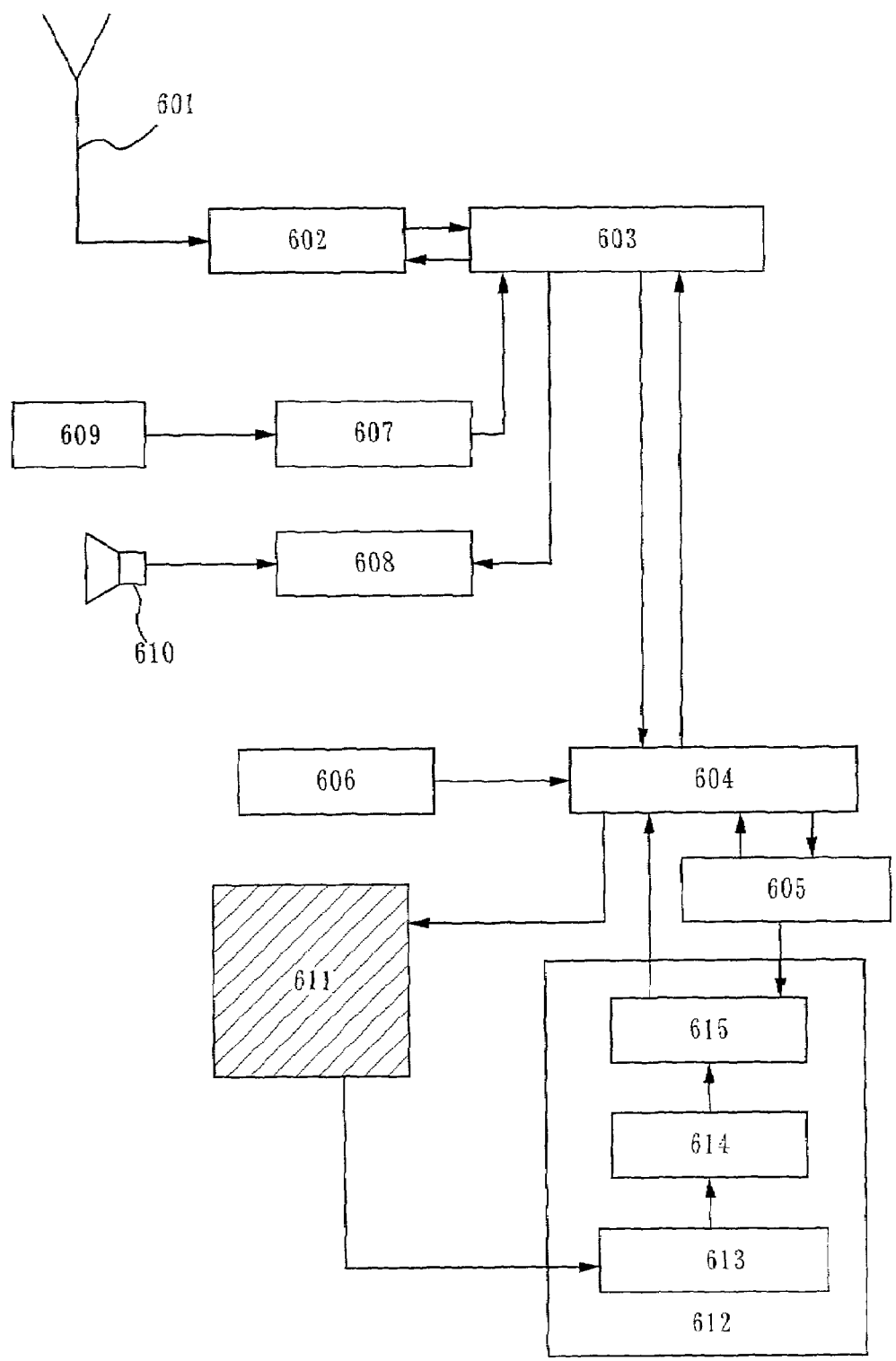
FIG. 6 is a block diagram showing a structure of an image sensor built-in type display.

FIG. 6 is a block diagram showing the mobile information communication device in the embodiment 1. This mobile information communication device includes an antenna 601, a transmitting/receiving circuit 602, a signal processing circuit 603 for compressing/expanding and coding the signals, a control microcomputer 604, a flash memory 605, a keyboard 606, a voice input circuit 607, a voice output circuit 608, a microphone 609 and a loudspeaker 610, which are the same configuration as the conventional device. In addition to the above, the present mobile information communication device includes an image sensor built-in display 611 and a collating circuit 612.

When collation is performed, analog image data obtained by the sensor incorporated into the display are converted into digital signals by an A/D converter 613. The converted digital signals are transmitted to and processed by a DSP (Digital Signal Processor) 614. The signal processing involves enhancing a change-of-density area of the image by use of a differential filter, so as to obtain effectively a more distinctive palm print. The palm print data obtained is converted into numerical values within the DSP 614 and transmitted to a comparing circuit 615. The comparing circuit 615 is given reference data stored in the flash memory 605, and collates the numerical data of the palm print with the reference data.

The method of judging the individual information may be classified into a feature collating method of collating a feature of collected data with a feature of the reference data, and an image matching method of comparing directly these two sets of data with each other. Either of these two methods may be used. Further, the user's identity can be authenticated more surely with providing plural pieces of authentication data obtained by changing somewhat a direction of the hand than with a single piece of reference data.

Herein, if coincidence is confirmed, the control microcomputer 604 output an authentication signal. The authentication signal is transmitted through the signal processing unit 603, the transmitting/receiving circuit 602 and the antenna 601, and reaches a host computer or a server via the Internet etc.

Embodiment 2

Figure 7:
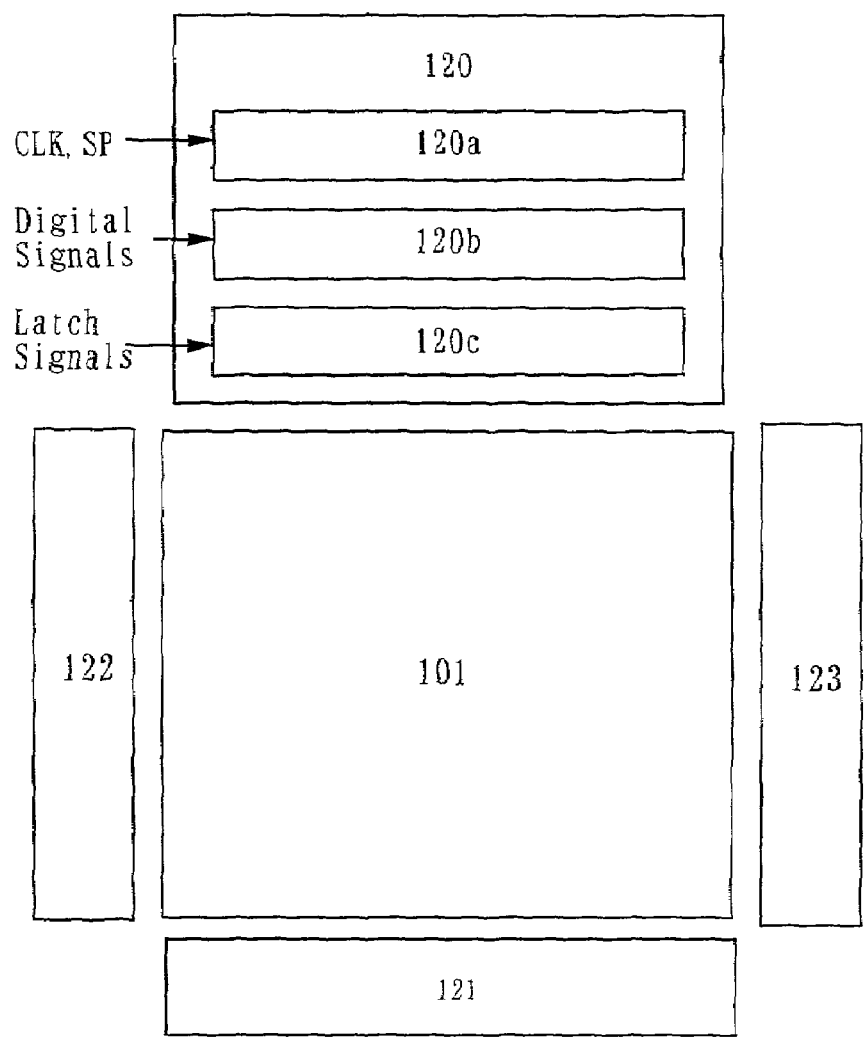
FIG. 7 is a block diagram showing a structure of the image sensor built-in type display.

FIG. 7 is a block diagram showing a structure of the sensor built-in type display used in the present invention. This display includes a source signal line driver circuit 120, a gate signal line driver circuit 122. The display further includes a sensor source signal line driver circuit 121 and a sensor gate signal line driver circuit 123, which control driving of a reset TFT, a buffer TFT and a selection TFT, which are provided for each pixel. Note that the source signal line driver circuit 120, the gate signal line driver circuit 122, the sensor source signal line driver circuit 121, the sensor gate signal line driver circuit 123 are generically called a driver circuit portion in this specification.

The source signal line driver circuit 120 has a shift register 120a, a latch (A) 120b and a latch (B) 120c. A clock signal (CLK) and a start pulse (SP) are inputted to the shift register 120a of the source signal line driver circuit 120. The shift register 120a sequentially generates timing signals based on the clock signal (CLK) and the start pulse (SP), and sequentially supplies the timing signals to the circuits disposed posterior thereto.

Note that the timing signals given from the shift register 120a may be buffer-amplified by a buffer etc (unillustrated) and the buffer-amplified timing signals are sequentially supplied to the circuits disposed posterior thereto. Wirings to which the timing signals are supplied are connected to a lot of circuits or elements, therefore have a large load capacitance (parasitic capacitance). The buffer is provided for preventing dullness in rise or fall of the timing signal, which occurs due to the large load capacitance.

Figure 8:
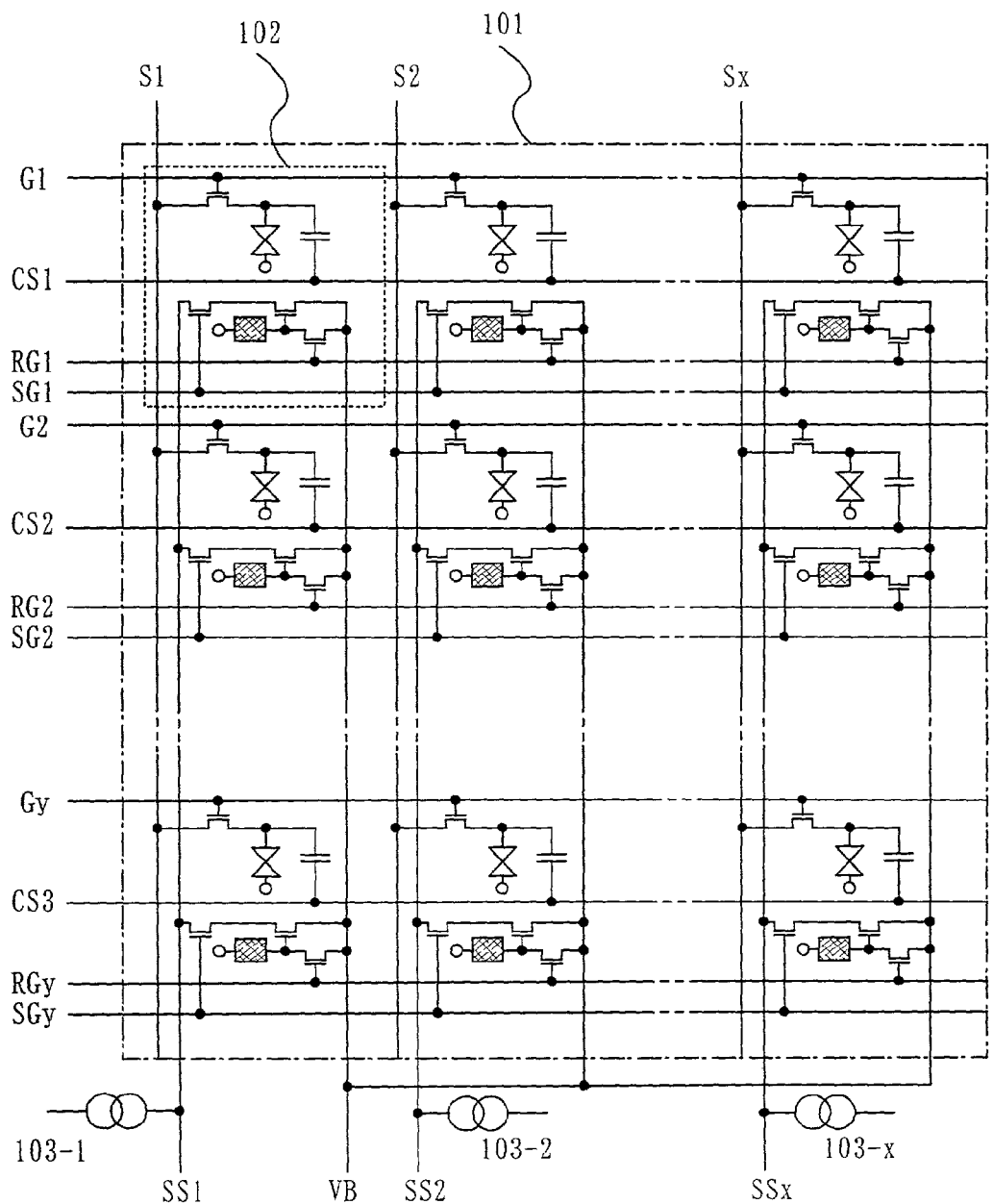
FIG. 8 is a diagram showing circuits of a pixel/sensor portion.

FIG. 8 is a diagram showing one example of circuits of a pixel/sensor portion 101. The pixel/sensor portion 101 is provided with source signal lines S1 to Sx, gate signal lines G1 to Gy, capacitance lines CS1 to CSy, reset gate signal lines RG1 to RGy, the sensor gate signal lines SG1 to SGy, the sensor output wirings SS1 to SSx and a sensor power source line VB.

The pixel/sensor portion 101 is constructed of a plurality of pixels 102. The pixel 102 includes any one of the source signal lines S1 to Sx, any one of the gate signal lines G1 to Gy, any one of the capacitance lines CS1 to CSy, any one of the reset gate signal lines RG1 to RGy, any one of the sensor gate signal lines SG1 to SGy, any one of the sensor output wirings SS1 to SSx, and the sensor power source line VB. Then, the sensor output wirings SS1 to SSx are connected respectively to constant current power sources 103-1 to 103-x.

Figure 9:
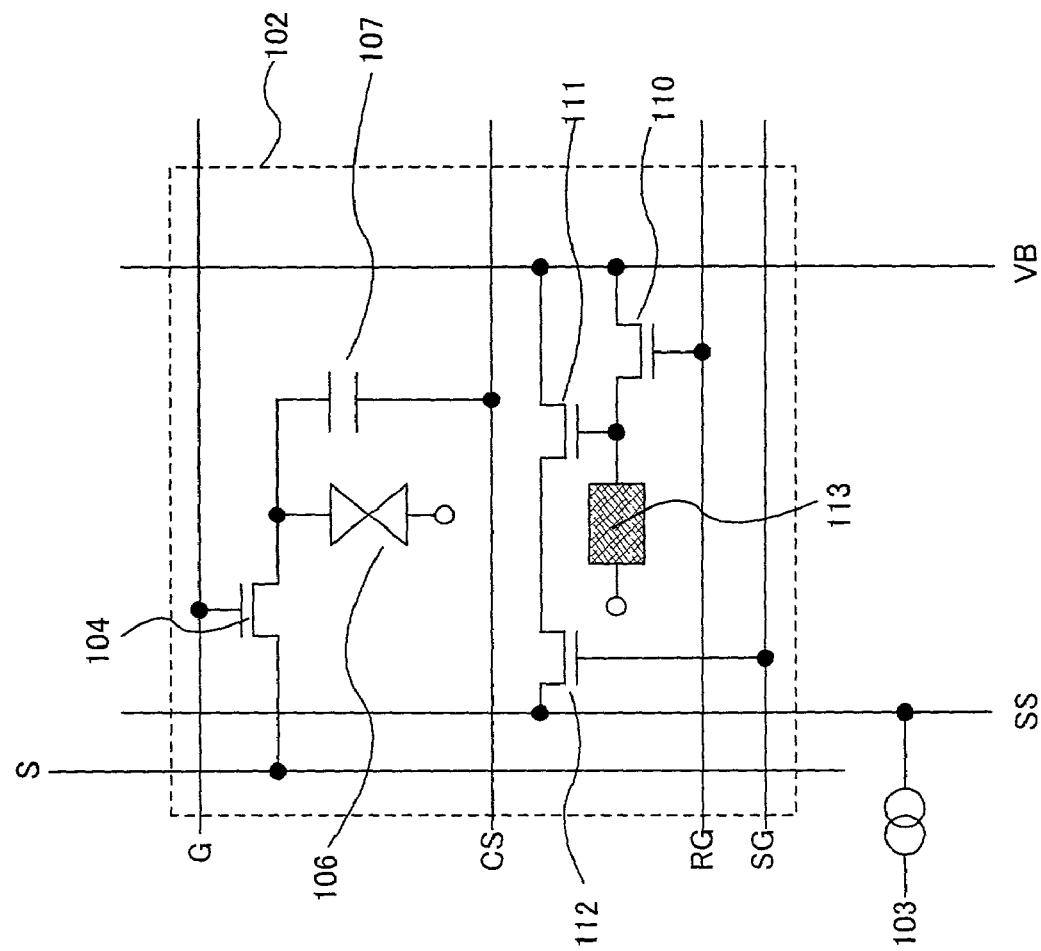
FIG. 9 is a diagram showing circuits for pixels.

FIG. 9 shows a detailed structure of the pixel 102. An area of the pixel 102 is defined by a dotted line. Note that the source signal line S implies any one of the source signal lines S1 to Sx. Further, the gate signal line G implies any one of the gate signal lines G1 to Gy. The capacitance line CS implies any one of the capacitance lines CS1 to CSy. The reset gate signal line RG implies any one of the reset gate signal lines RG1 to RGy. The sensor gate signal line SG implies any one of the sensor gate signal lines SG1 to SGy. The sensor output wiring SS implies any one of the sensor output wirings SS1 to SSx.

The pixel 102 has a pixel TFT 104 for driving a liquid crystal, a liquid crystal element 106 and a storage capacitor 107. The liquid crystal element 106 is composed of a pixel electrode, an opposing electrode and a liquid crystal layer interposed between these electrodes. A gate electrode of the pixel TFT 104 is connected to the gate signal line G. Then, one of a source region and a drain region of the pixel TFT 104 is connected to the source signal line, and the other is connected to the liquid crystal element 106 and to the storage capacitor 107.

Further, the pixel 102 includes a reset TFT 110, a buffer TFT 111, a selection TFT 112 and a photo diode 113. A gate electrode of the reset TFT 110 is connected to the reset gate signal line RG. A source region of the reset TFT 110 is connected to the sensor power source line VB. The sensor power source line VB is always kept at a fixed potential (reference potential). Further, a drain region of the reset TFT 110 is connected to the photo diode 113 and to a gate electrode of the buffer TFT 111.

The photo diode 113, though not illustrated, includes a cathode electrode, an anode electrode and a photoelectric converting layer provided between the cathode electrode and the anode electrode. Specifically, the drain region of the reset TFT 110 is connected to the anode electrode or the cathode electrode of the photo diode 113. The drain region of the buffer TFT 111 is connected to the sensor power source line VB and always kept at the fixed reference potential. Then, the source region of the buffer TFT 111 is connected to a source region or a drain region of the selection TFT 112.

A gate electrode of the selection TFT 112 is connected to the sensor gate signal line SG. Then, one of the source and drain regions of the selection TFT 112 is, as described above, connected to the source region of the buffer TFT 111, and the other is connected to the sensor output wiring SS. The sensor output wiring SS is connected to the constant current power source 103 (any one of the constant current power sources 103-1 to 103-x), and invariably a constant current flows therethrough.

A timing signal from the shift register 120a shown in FIG. 7 is supplied to the latch (A) 120b which includes latches, disposed at a plurality of stages, for processing the digital signals. The latch (A) 120b sequentially writes the digital signals simultaneously when the timing signal is inputted.

Note that when the latch (A) 120b takes in the digital signals, the digital signals may be sequentially inputted to the latches, provided at the plurality of stages, of the latch (A) 120b. The invention of the present application is not, however, limited to this configuration. A so-called division driving mode may be carried out, wherein the latches, provided at the plurality of stages, of the latch (A) 120b are divided into some groups, and the digital signals are inputted in parallel to the respective groups. Note that the number of groups is referred to as the number of divisions in this case. For example, if the latches are divided into the groups each consisting of four stages, this may be called a divided-by-4 division driving mode.

A period, till having the writing process of the digital signals to the all-stage latches of the latch (A) 120b substantially finished, is termed a line period. Namely, the line period starts when writing of the digital signal to the latch provided at the leftmost stage of the latch (A) 120b starts, and finishes when writing of the digital signal to the latch provided at the rightmost stage finishes. In fact, however, the line period might include a horizontal retrace line period.

Upon an end of one line period, a latch signal is supplied to the latch (B) 120c. At this moment, the digital signals written to and stored in the latch (A) 120b are simultaneously sent to the latch (B) 120c, and written to and stored in the all-stage latches of the latch (B) 120c.

The latch (A) 120b, which has finished sending the digital signals to the latch (B) 120c, sequentially writes again digital signals in accordance with the timing signal given from the shift register 120a. During one line period at this second cycle, the digital signals written to and stored in the latch (B) 120c are inputted to the source signal lines S1 to Sx.

On the other hand, the gate signal side driver circuit 122 has the shift register and the buffer (both are not shown). Further, the gate signal side driver circuit 122 may include a level shift in addition to the shift register and the buffer as the case may be.

In the gate signal side driver circuit 122, a gate signal given from the shift register (unillustrated) is supplied to the buffer (unillustrated) and further supplied to a corresponding gate signal line. The gate electrodes of the pixel TFTs 104 of the pixels for one line are connected to the respective gate signals lines G1 to Gy, and the pixel TFTs 104 of all the pixels for one line must be simultaneously brought into an ON-state. The buffers which is capable of flowing a large current are therefore used.

Note that the numbers, configurations and operations of the source signal line driver circuits and the gate signal line driver circuits, are not limited to those described in this embodiment. For an area sensor used for the sensor built-in display according to the present invention, known source and gate signal line driver circuits may be used. The embodiment 2 may be applied by combining the configuration thereof with the embodiment 1.

Embodiment 3

Figure 10:
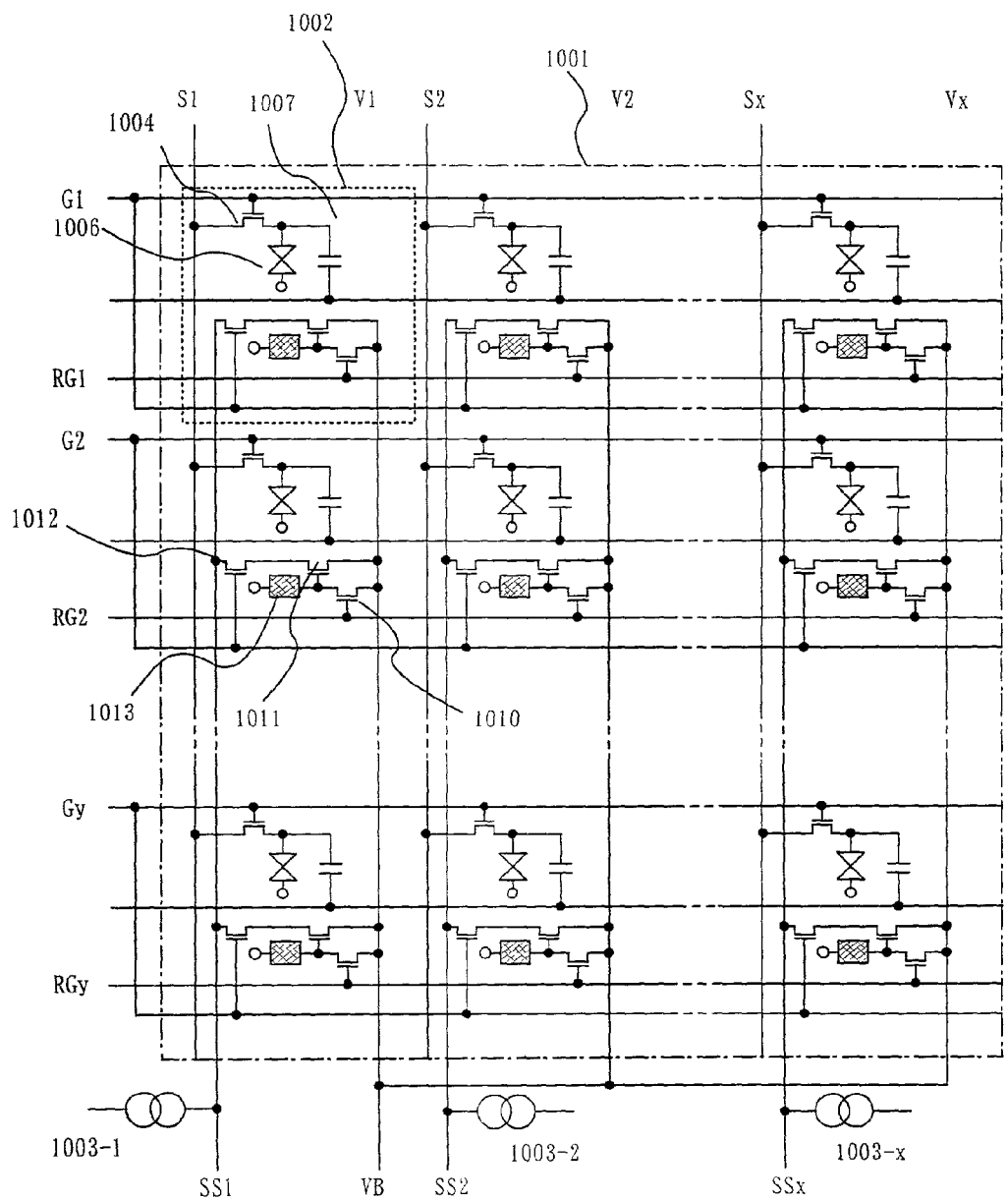
FIG. 10 is a diagram showing circuits of the pixel/sensor portion.

FIG. 10 is a diagram showing circuits of a sensor portion with a different configuration from the sensor portion in the embodiment 2. A pixel/sensor portion 1001 is provided with the source signal lines S1 to Sx, the gate signal lines G1 to Gy, the capacitance lines CS1 to CSy, the reset gate signal lines RG1 to RGy, the sensor output wirings SS1 to SSx and the sensor power source line VB.

The pixel/sensor portion 1001 has a plurality of pixels 1002. The pixel 1002 includes any one of the source signal lines S1 to Sx, any one of the gate signal lines G1 to Gy, any one of the capacitance lines CS1 to CSy, any one of the reset gate signal lines RG1 to RGy, any one of the sensor output wirings SS1 to SSx, and the sensor power source line VB. The sensor output wirings SS1 to SSx are connected respectively to constant current power sources 1003-1 to 1003-x.

The pixel 1002 has a pixel TFT 1004, a storage capacitor 1007 and a liquid crystal element 1006. The pixel 1002 further includes a reset TFT 1010, a buffer TFT 1011, a selection TFT 1012 and a photo diode 1013.

The liquid crystal element 1006 is composed of a pixel electrode, an opposing electrode and a liquid crystal layer interposed between these electrodes. A gate electrode of the pixel TFT 1004 is connected to the gate signal line (G1 to Gy). Then, one of a source region and a drain region of the pixel TFT 1004 is connected to the source signal line S, and the other is connected to the liquid crystal element 1006 and to the storage capacitor 1007.

A gate electrode of the reset TFT 1010 is connected to the reset gate signal line (RG1 to RGx). A source region of the reset TFT 1010 is connected to the sensor power source line VB. The sensor power source line VB is always kept at a fixed potential (reference potential). Further, a drain region of the reset TFT 1010 is connected to the photo diode 1013 and to a gate electrode of the buffer TFT 1011.

The photo diode 1013, though not illustrated, includes a cathode electrode, an anode electrode and a photoelectric converting layer provided between the cathode electrode and the anode electrode. Specifically, the drain region of the reset TFT 1010 is connected to the anode electrode or the cathode electrode of the photo diode 1013.

The drain region of the buffer TFT 1011 is connected to the sensor power source line VB and always kept at the fixed reference potential. Then, the source region of the buffer TFT 1011 is connected to a source region or a drain region of the selection TFT 1012.

A gate electrode of the selection TFT 1012 is connected to the gate signal line (G1 to Gx). Then, one of the source and drain regions of the selection TFT 1012 is, as described above, connected to the source region of the buffer TFT 1011, and the other is connected to the sensor output wiring (SS1 to SSx). The sensor output wirings (SS1 to SSx) are connected respectively to the constant current power source 1003 (the constant current power source 1003-1 to 1003-x), and invariably a constant current flows therethrough.

In the embodiment 3, a polarity of the pixel TFT 1004 is same as that of the selection TFT 1012. Namely, if the pixel TFT 1004 is an n-channel TFT, the selection TFT 1012 is likewise the n-channel TFT. Further, if the pixel TFT 1004 is an p-channel TFT, the selection TFT 1012 is similarly the p-channel TFT.

The sensor portion of the image sensor in the embodiment 3 has, unlike the image sensor shown in FIG. 8, such a configuration that both of the gate electrodes of the pixel TFT 1004 and of selection TFT 1012 are connected to the gate signal lines (G1 to Gx). Hence, in the case of the image sensor in the embodiment 3, a period for which the liquid crystal element 1006 of each pixel emits light has the same length as a sampling period (ST1 to STn). With the above configuration, the number of the wirings of the image sensor in the embodiment 3 can be made smaller than in the case of FIG. 8. The embodiment 3 discussed above may be carried out by combining its configuration with the embodiment 1 as it is intended.

Embodiment 4

Figure 11:
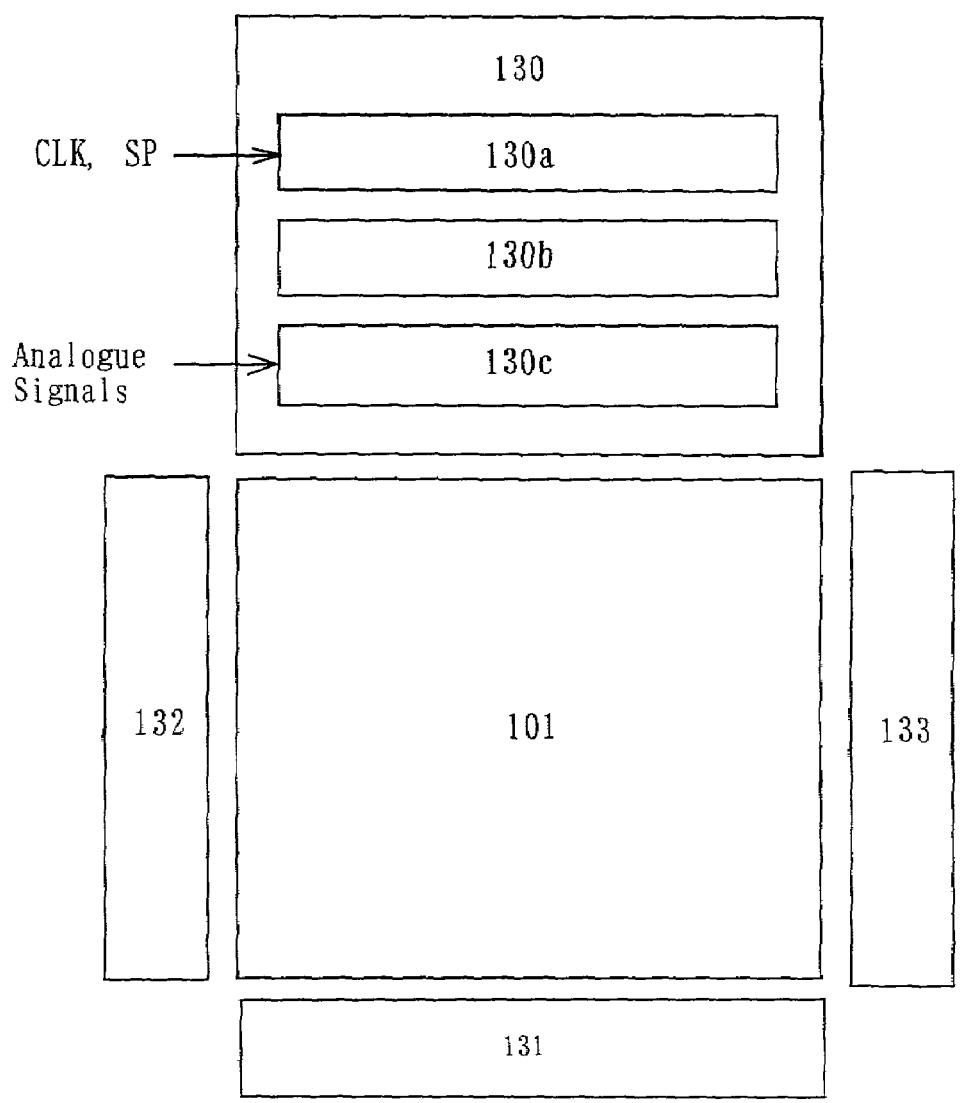
FIG. 11 is a block diagram showing a structure of the image sensor built-in type display.

FIG. 11 is a block diagram showing a structure of the sensor built-in type display in an embodiment 4. A source signal line driver circuit 130, a gate signal line driver circuit 132, a sensor source signal line driver circuit 131, and a sensor gate signal line driver circuit 133 are provided. One source signal line driver circuit and one gate signal line driver circuit are provided in the embodiment 4, however, the invention of the present application is not confined to this configuration. Two pieces of source signal line driver circuits may be provided. Further, two pieces of gate signal line driver circuits may also be provided.

The source signal line driver circuit 130 has a shift register 130a, a level shift 130b and a sampling circuit 130c. Note that the level shift may be used when the necessity arises and may not necessarily be used. Further, the embodiment 4 takes a configuration in which the level shift is provided between the shift register 130a and the sampling circuit 130c, however, the invention of the present application is not limited to this configuration. Moreover, there may be taken such a configuration that the shift register 130a incorporates the level shift 130b.

The clock signal (CLK) and the start pulse signal (SP) are inputted to the shift register 130a. A sampling signal for sampling a analog signal is outputted from the shift register 130a. The outputted sampling signal is inputted to the level shift 130b and then outputted with its potential amplitude increased.

The sampling signal outputted from the level shift 130b is inputted to the sampling circuit 130c. Then, the analog signals inputted to the sampling circuit 130c are each sampled in accordance with the sampling signal, and inputted to the source signal lines S1 to Sx.

On the other hand, the gate signal side driver circuit 132 has the shift register and the buffer (both are not illustrated). Further, the gate signal side driver circuit 132 may have the level shift in addition to the shift register and the buffer as the case may be.

In the gate signal side driver circuit 132, a gate signal from the shift register (not shown) is supplied to the buffer (not shown) and further supplied to the corresponding gate signal line. The gate signal lines G1 to Gy are respectively connected to the gate electrodes of the pixel TFTs 104 of the pixels for one line, Since the pixel TFTs 104 of all the pixels for one line must be simultaneously brought into an ON-state, the buffers which is capable of flowing a large current are therefore used.

Note that the numbers, configurations and operations of the source signal line driver circuits and the gate signal line driver circuits, are not limited to those described in this embodiment. The image sensor used for the sensor built-in display according to the present invention may involve the use of the known source and gate signal line driver circuits.

Note that the pixel/sensor portion 101 in the embodiment 4 may have the configuration shown in FIG. 8 or FIG. 10. The embodiment 4 may be carried out by combining with the embodiment 1 or 3 as it is intended.

Embodiment 5

In this embodiment, the method of manufacturing TFTs which respectively construct the pixel and the sensor portion on the substrate is described in detail. First, as shown in FIG. 12A, a blocking layer 702 is formed of an insulating film such as a silicon oxide film, a silicon nitride film, or a silicon nitride oxide film on a glass substrate 701 made of barium borosilicate glass represented by such as #7059 glass or #1737 glass of Corning Inc., or alumino borosilicate glass. For example, a silicon nitride oxide film 702a with a thickness of 10 to 200 nm (preferably 50 to 100 nm) is manufactured by a plasma CVD method from $SiH_4$, $NH_3$, and $N_2O$, and a silicon hydride nitride oxide film 702b manufactured similarly from $SiH_4$ and $N_2O$ is laminated and formed with a thickness of 50 to 200 nm (preferably 100 to 150 nm). In this embodiment, the blocking layer 702 is shown as a two layer structure, but it may be formed as a single layer film or a lamination of two layers or more of the insulating films.

Semiconductor layers 703 to 707 divided into island shapes are formed of a semiconductor film with a crystal structure (herein below, referred to as crystalline semiconductor film) obtained by treatment of a semiconductor film with an amorphous structure using a laser annealing method or a furnace annealing oven. The island shape semiconductor layers 703 to 707 are formed with a thickness of 25 to 80 nm (preferably 30 to 60 nm). There is no limitation on the material of the crystalline semiconductor film, but preferably is formed of such as silicon or silicon germanium (SiGe) alloy.

In the case of manufacturing the crystalline semiconductor film by a laser annealing method, a pulse oscillation type or a continuous-wave type excimer laser, YAG laser, or $YVO_4$ laser is used. When such laser is used, it is appropriate that laser light radiated from a laser oscillator is condensed by an optical system into a linear beam and is irradiated to the semiconductor film. Although the condition of crystallization should be properly selected by an operator, a pulse oscillation frequency is made 30 Hz, and a laser energy density is made 100 to 400 mJ/cm$^2$ (typically 200 to 300 mJ/cm$^2$) when the excimer laser is used. It is appropriate that the second harmonic is used, a pulse oscillation frequency is made 1 to 10 kHz, and a laser energy density is made 300 to 600 mJ/cm$^2$ (typically, 350 to 500 mJ/cm$^2$) when the YAG laser is used. Then, laser light condensed into a linear shape with a width of 100 to 1000 μm, for example, 400 μm is irradiated to the whole surface of the substrate, and an overlapping ratio (overlap ratio) of the linear laser light at this time is made 80 to 98%.

Next, the gate insulating film 708 for covering the island shape semiconductor layer 703 to 707 is formed. The gate insulating film 708 with a thickness of 40 to 150 nm is formed by a plasma CVD method or a sputtering method with an insulating film including silicon. In this embodiment, the gate insulating film is formed of a silicon nitride oxide film with a thickness of 120 nm. Of course, the gate insulating film 708 is not limited to such a silicon nitride oxide film, and may be another insulating film including silicon as a single layer or a lamination structure.

The first conductive film 709a and the second conductive film 709b are formed on the gate insulating film 708 for a gate electrode. In this embodiment, the first conductive film with a thickness of 50 to 100 nm 709a is formed of tantalum nitride or titanium, and the second conductive film 709b with a thickness 100 to 300 nm is formed of tungsten. These materials are stable even under thermal processing at 400 to 600° C. in a nitrogen atmosphere, and the resistivity does not increase significantly.

Next, as shown in FIG. 12B, masks 710 to 715 are formed of resist, and a first etching treatment for forming gate electrodes is carried out. Although there is no limitation on the etching method, an ICP (Inductively Coupled Plasma) etching method is preferably used, in which $CF_4$ and $Cl_2$ are mixed for an etching gas, and an RF (13.56 MHZ) power of 500 W is applied to a coil type electrode preferably under a pressure of 1 Pa to generate plasma. An RF (13.56 MHZ) power of 100 W is also applied to the side of the substrate (sample stage), and a substantially negative self bias voltage is applied. When $CF_4$ and $Cl_2$ are mixed with each other, the tungsten film, the tantalum nitride film and the titanium film are etched to the same degree.

With the above etching conditions, the edges become taper-shaped due to the effect of the shapes of the masks of resist and the bias voltage applied to the substrate side. The angle of the taper portion becomes 15 to 45°. In order to carry out the etching without leaving a residue on the gate insulating film, it is appropriate that an etching time is increased at a rate of about 10 to 20%. Since the selection ratio of the silicon nitride oxide film to the tungsten film is 2 to 4 (typically 3), a surface, on which the silicon nitride oxide film is exposed, is etched by about 20 to 50 nm by an over etching treatment. In this way, first shape conductive layers 716 to 721 made of first conductive layers and second conductive layers (first conductive layers 716a to 721a and second conductive layers 716b to 721b) are formed by the first etching treatment. Reference numeral 722 designates a gate insulating film, and regions which are not covered with the first shape conductive layers are etched by about 20 to 50 nm to be thin.

Then, as shown in FIG. 12C, a first doping treatment is carried out to dope an impurity element (donor) to give an n type conductivity. Doping may be carried out by an ion doping method or an ion injecting method. The condition of the ion doping method is that a dosage is $1 \times 10^{13}$ to $5 \times 10^{14}$ atoms/cm$^2$. As the impurity element to give the n type conductivity, an element which belongs to group 15, typically phosphorus (P) or arsenic (As) is used. In this case, the accelerating voltage is controlled (for example, 20 to 60 keV) and the first shape conductive layers are used as masks. The first impurity regions 723 to 727 are thus formed. The concentration of the impurity to give the n type conductivity is in the range of $1 \times 10^{20}$ to $1 \times 10^{21}$ atoms/cm$^3$ in the first impurity regions 723 to 720.

Next, as shown in FIG. 12D, a second etching treatment is carried out. The ICP etching device is similarly used, $CF_4$, $Cl_2$ and $O_2$ are mixed for an etching gas, and an RF power (13.56 MHZ) of 500 W is applied to a coil type electrode under a pressure of 1 Pa to generate plasma. An RF (13.56 MHZ) power of 50 W is applied to the side of the substrate (sample stage), and a low self bias voltage as compared with the first etching treatment is applied. The tungsten film is anisotropically etched under the above condition, and the tantalum nitride film or the titanium film of the first conductive layers is left to reside. In this way, the second shape conductive layers 728 to 733 (first conductive layers 728a to 733a and second conductive layers 728b to 733b) are formed. Reference numeral 739 designates a gate insulating film, and regions which are not covered with the second shape conductive layers 728 to 733 are further etched by about 20 to 50 nm to be thin.

The etching reaction with the mixed gas of $CF_4$ and $Cl_2$ to the W film or the TaN film can be estimated from types of generated radicals or ions and vapor pressure of products after the reaction. Comparing the vapor pressures of the fluorides and chlorides of W and TaN, $WF_6$, which is a fluoride of W, is extremely high and the others, $WCl_5$, $TaF_5$ and $TaCl_5$, are approximately the same. Accordingly, both the W film and the TaN film are etched with the mixed gas of $CF_4$ and $Cl_2$. When a proper amount of $O_2$ is added to this mixed gas, however, $CF_4$ and $O_2$ react to become CO and F so as to generate a large amount of F radicals or F ions. As a result, the etching rate of the W film increases since vapor pressure of the fluoride is high. On the other hand, the increase of the etching rate for TaN is comparatively small even when F increases. In addition, TaN can be more easily oxidized compared to W and, therefore, the addition of $O_2$ causes a slight oxidization of the surface of TaN. Since the oxides of TaN do not react with fluorine or chlorine, the etching rate of the TaN film is further reduced. Accordingly, it becomes possible to make a difference between the etching rates of the W film and the TaN film and it becomes possible to make the etching rate of the W film be greater than that of the TaN film.

Then, a second doping treatment is carried out. In this case, a dosage is made lower than that of the first doping treatment and an impurity (donor) to give the n type conductivity is doped under the condition of a high acceleration voltage. For example, an acceleration voltage is made 70 to 120 keV, and the treatment is carried out with a dosage of $1 \times 10^{13}$ atoms/cm$^2$, so that second impurity regions 734 to 738 are formed inside of the first impurity regions formed in the island-like semiconductor layers in FIG. 12C. Doping is carried out in such a manner that the second shape conductive layers 728b to 733b are used as masks to the impurity element and the impurity element is added to the regions under the second shape conductive layers 728a to 733a. Since, the second shape conductive layers 728a to 733a are left with substantially the same film thicknesses, the difference in the concentration distribution in the direction along the second shape conductive layers 728a to 733a is small and the n type impurity (donor) are included with a concentration of $1 \times 10^{17}$ to $1 \times 10^{19}$ atoms/cm$^3$.

Next, as shown in FIG. 13A, a third etching treatment is carried out, and an etching treatment of the gate insulating film is carried out. As a result, the second shape conductive layers 728a to 733a are also etched to become smaller with the edges withdrawn, and the third shape conductive layers 740 to 745 (the first conductive layers 740a to 745a and the second conductive layers 740b to 745b) are formed. Reference numeral 746 is a gate insulating film that is left behind, and the surface of the semiconductor film may be exposed by further carrying out etching.

For forming a p-channel TFT, resist masks 758 to 760 as shown in FIG. 13B, and p-type impurity (acceptor) is doped to the island-like semiconductor layer forming the p-channel TFT. The p-type impurity (acceptor) is selected from elements which belong to group 13, and typically boron (B) is used. The concentration of the impurity of the third impurity regions 767a, 767b, 767c, 768a, 768b and 768c is in the range of $2 \times 10^{20}$ to $2 \times 10^{21}$ atoms/cm$^3$. Since the third impurity regions include phosphorous, boron is added at the 1.5 times to 3 times concentration to inverse the conductivity type.

Impurity regions are formed with the above steps in the semiconductor layer. Thereafter, in the step shown in FIG. 13C, the masks 769 and 770 are made of resist, and the third shape conductive layer 743 on the semiconductor layer 706 for a photo diode is removed. The third shape conductive layers 740, 741, 742 and 744 become gate electrodes and the third shape conductive layer 745 becomes a capacitance wiring.

Next, as shown in FIG. 14A, a first interlayer insulating film 771 from a silicon nitride film or a silicon nitride oxide film is then formed by a plasma CVD method. Then, a step of activating the impurity element added in the respective island-like semiconductor layers in order to control the conductivity is performed. Activation is preferably performed by a thermal annealing method using a furnace annealing oven. In addition, a laser annealing method or a rapid thermal annealing method (RTA method) may be applied. As a thermal annealing method the oxygen concentration is 1 ppm or less, preferably 0.1 ppm or less, and the activation is performed in a nitrogen atmosphere of 400 to 700° C., typically 500 to 600° C. In this embodiment, a thermal processing of 4 hours at 500° C. is performed. As a result, hydrogen in the first interlayer insulating film 771 is discharged to be dispersed inside the island-like semiconductor film so that hydrogenation may be performed simultaneously.

Hydrogenation is performed in at atmosphere including hydrogen of 3 to 100%, and thermal processing may be performed for 1 to 12 hours at 300 to 450° C. In any case it is a step for terminating the dangling bonds of semiconductor layers by hydrogen. As other means of hydrogenation, it is possible to perform plasma hydrogenation (using hydrogen excited by plasma).

Contact holes are formed next in the first interlayer insulating film 771, and sensor output wirings 772, connection wirings 773, sensor power source lines 775, connection wirings 777, common connection lines 779, source signal lines 780 and drain wiring 781 is formed.

A passivation film 782 is formed next on these wirings and a second interlayer insulating film 783 is formed. A passivation film 782 is formed of a silicon nitride film into a thickness of 50 nm. Further, the second interlayer insulating film 783 made of organic resin is formed with a thickness of about 1000 nm. As an organic resin film, polyimide, acrylic, polyimideamide and the like may be used. The advantages of using an organic resin film is that film formation method is easy, has a low specific dielectric constant thereby reducing parasitic capacitance, excellent in leveling, and the like. Note that, other organic resin films may also be used. Here, after application to the substrate, a polyamide which is a type that thermal polymerizes is used, and is fired at 300° C. to be formed.

Next, a contact hole reaching the drain wiring 781 is formed in the second interlayer insulating film 783 and the passivation film 782, and a pixel electrode 784 is formed to a thickness of 400 to 1000 nm. The pixel electrode is formed from high reflectivity conductive material such as aluminum or silver. The reflective type liquid crystal display device is formed with fine unevenness on the surface of the pixel electrodes, and it is preferable that light which reflects on this surface disperses. Further, an opening 785 is formed on the photo diode 804 and light is made to enter.

In this way, a buffer TFT 801, a selection TFT 802, a reset TFT 803, a photo diode 804, a pixel TFT 805 and a storage capacitance 806 are formed.

The buffer TFT 801 is an n-channel TFT, and contains a channel forming region 810, a second impurity region 811 (gate overlapping drain: GOLD region) overlapping with the gate electrode formed from the third shape conductive layer 740, a second impurity region 812 (lightly doped drain) formed outside the gate electrode, and the first impurity region 813 which functions as the source region or the drain region.

The selection TFT 802 is also an n-channel TFT, and contains a channel forming region 814, a second impurity region 815 overlapping the gate electrode comprising the third shape conductive layer 741, a second impurity region 816 formed outside the gate electrode, and a first impurity region 817 which functions as the source region or the drain region.

The reset TFT 803 is a p-channel TFT, and contains a channel forming region 818, third impurity regions 819 to 821 which function as the source region or the drain region.

The photo diode 804 comprises third regions 826 to 828 which have been doped with p-type impurity, first impurity region 825 and second impurity regions 823 and 834 to which n-type impurity is doped, and an intrinsic region 822 which is not doped with impurities, and namely has a structure of a pin type structure. Then, the first impurity region 825 is formed to contact the connection wiring 777 and to connect with the drain side of the reset TFT 803. The other third impurity region 828 forms a contact with the common wiring 779.

The pixel TFT 805 includes a channel forming region 829, a second impurity region 830 (GOLD region) overlapping with the third shape conductive layer 744 forming the gate electrode, a second impurity region 831 (LED region) formed outside the gate electrode, and the first impurity regions 832, 833, 834 functioning as a source region or a drain region. Besides, the semiconductor layer 835 functioning as one of electrodes of the storage capacitor 806 is formed continuously from the first impurity region and is formed as regions 836 and 837 doped with impurity at the same concentration as the second impurity region at the terminal portion.

Figure 15:
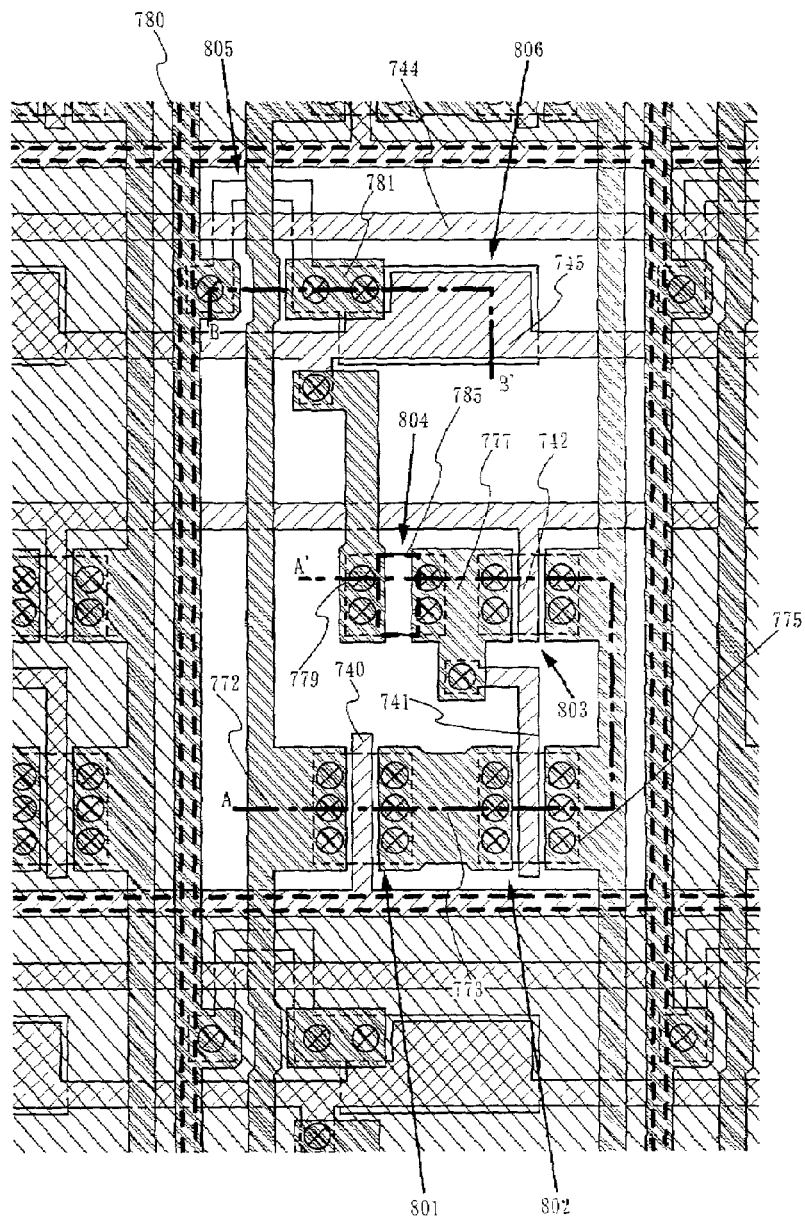
FIG. 15 is an explanatory top view showing a geometry of the pixels in an active matrix type liquid crystal display device provided with the image sensor.

FIG. 15 shows a top view of a pixel. In FIG. 15, the A–A' line and the B–B' line respectively correspond to the A–A' line and the B–B' line shown in FIG. 14B. The liquid crystal display device used in this invention is a reflection type so that the opening ratio is not decreased even if a TFT is formed under the pixel electrode. Further, the pixel electrode 784 is formed so as to overlap with the source wiring 780 to have light shielding property. It is possible to enlarge an area of the pixel electrode and increase the aperture ratio with such a structure.

Note that, the present invention is not limited to the manufacturing methods described above, and it is possible to use another known manufacturing method. Further, this embodiment may be implemented by freely combining with any one of Embodiments 1 to 4 to be implemented.

Embodiment 6

The photo sensor provided for each pixel may be formed of an amorphous semiconductor. A different point in the case will be explained referring to FIG. 16 in an embodiment 6.

Referring to FIG. 16A, after the processes explained in FIG. 13C in the embodiment 5, a first passivation film 840 is formed of a nitride silicon film to be 50 to 100 nm thick. A lower electrode 841 of a photoelectric conversion layer is provided on the first passivation film. The lower electrode 841 may be composed of aluminum or titanium. The photoelectric conversion layer is formed with the plasma CVD method to be a three-layered structure in which an n-type amorphous silicon film 842 with a thickness of 20 to 50 nm, an intrinsic (i-type) amorphous silicon film 843 with a thickness of 500 to 1000 nm and a p-type amorphous silicon film 844 with a thickness of 10 to 20 nm are sequentially stacked. Further, a transparent conductive film 845 composed of indium oxide, zinc oxide, or the like is provided. Thus, the photo diode can be formed with two photo masks, one for patterning the lower electrode, one for patterning the photoelectric conversion layer and the transparent conductive film.

Then, there are provided a first inter-layer insulating film 846, an sensor output wiring 851, a connection wiring 852, a sensor power source line 854, a connection wiring 856, a common connection line 857, a source signal line 858, and a drain wiring 859. Referring to FIG. 16(B), a second passivation film 860 and a second inter-layer insulating film 861 are provided on an upper layer of these wirings. The second passivation film 860 is formed of the nitride silicon film that is 50 nm thick. The second inter-layer insulating film 861 composed of an organic resin is approximately 1000 nm in thickness.

Moreover, a pixel electrode 862 having a thickness of 400 to 1000 nm is provided on the second inter-layer insulating film 861. An opening 863 is formed above the photo diode 864 to admit an incidence of light. The photo diode 864 taking a pin-type structure using amorphous silicon is capable of gaining a high light sensitivity and a wide dynamic range (a brightness-to-darkness ratio), and is therefore preferably used for the photo sensor of the present invention. The embodiment 6 may be carried out in a way of its being combined with the embodiments 1 to 4 as it is intended.

Embodiment 7

Figure 17:
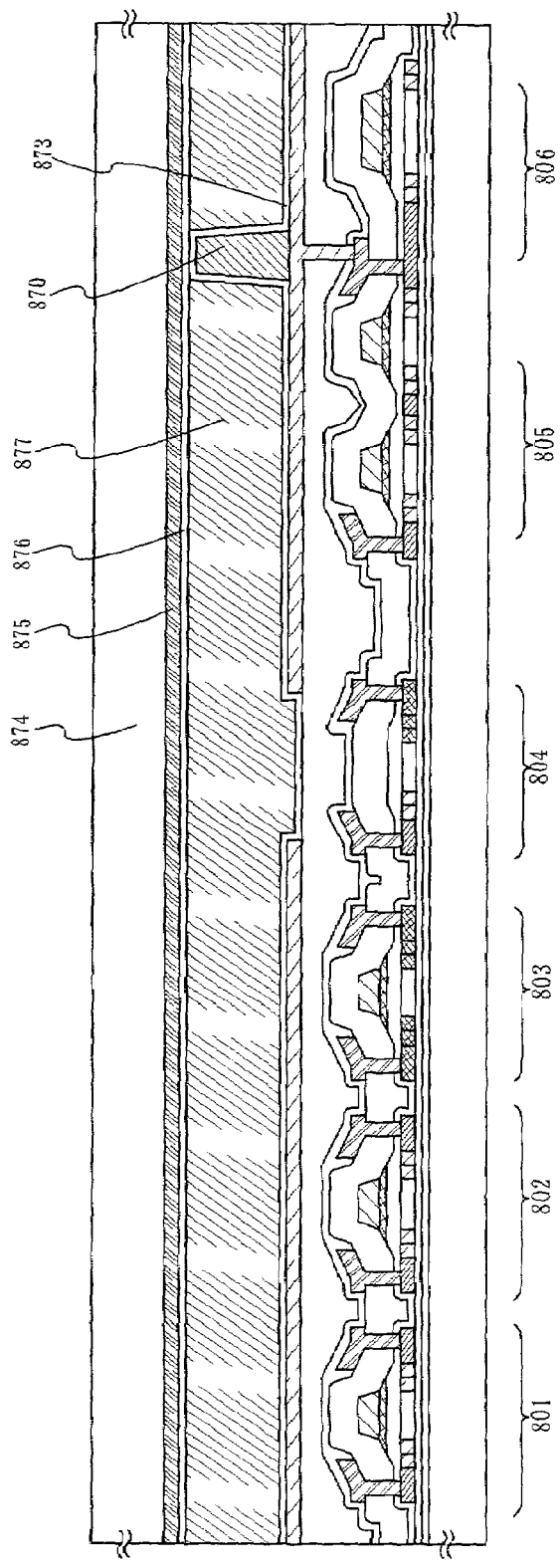
FIG. 17 is a sectional view showing the active matrix type liquid crystal display device.
Figure 18:
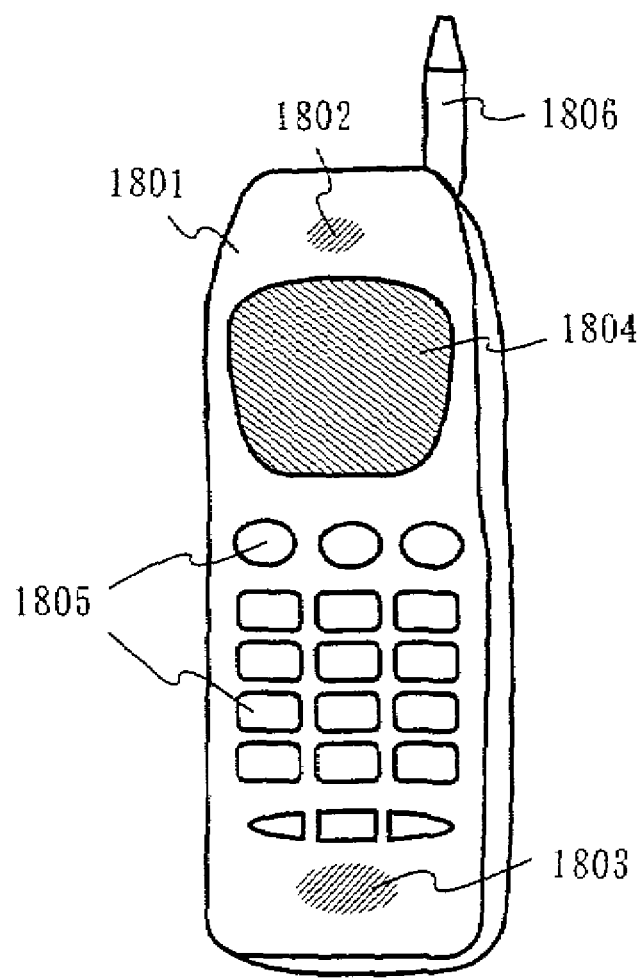
FIG. 18 is a view showing a conventional mobile telephone.
Figure 19:
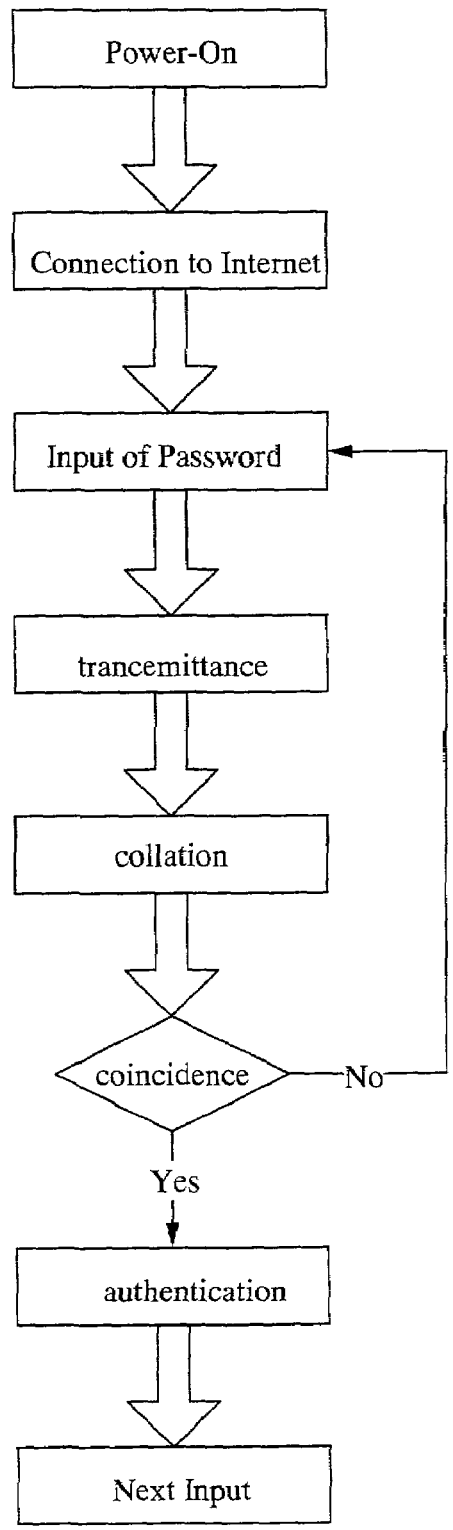
FIG. 19 is a flowchart showing a flow of authenticating a user's identity.

The description in an embodiment 7 will be focused on a process of manufacturing an active matrix type liquid crystal display device from the TFT array substrate manufactured in the embodiment 5. To start with, the TFT array substrate in the state of FIG. 14B is obtained in accordance with the embodiment 5, and thereafter, as shown in FIG. 17, a column-shaped spacer 870 is formed. This type of column-shaped spacer is formed at a predetermined position by getting a photosensitive resin film subjected to an exposure process and a developing process. A material of the photosensitive resin film is not limited. For example, however, NN700 made by JSR Corp. is used. This photosensitive resin is coated by a spinner and hardened by heating at 150 to 200° C. in a clean oven. The thus manufactured spacer can be made different in its shape depending on conditions of the exposure and developing processes. The column-shaped spacer 870 is preferably 2 to 7 μm and more preferably 4 to 6 μm in height. If the top the column-shaped spacer 870 is flat, it is feasible to ensure a mechanical strength as a liquid crystal display panel when the substrate at the opposite side is bonded. An orientation film 873 is formed thereon and subjected to a rubbing process.

An opposing electrode 875 is formed on an opposing substrate 874, and, the rubbing process is executed after an orientation film 876 is formed. Then, the TFT array substrate and the opposing substrate are bonded together with a sealing material (not shown). Thereafter, a liquid crystal material is injected in between the two substrates, thereby forming a liquid crystal layer 877. A known liquid crystal material may be used for the liquid crystal layer 877. If a normally white type liquid crystal, which performs a white display when a driving voltage is not applied, is used, the light can be always made enter to the photo diode via the opening formed in the pixel electrode. The active matrix type liquid crystal display device shown in FIG. 17 is thus completed. Further, the active matrix type liquid crystal display device can be manufactured similarly from the TFT array substrate shown in the embodiment 6. Further, the active matrix type liquid crystal display device manufactured herein may be applied to the liquid crystal display device described in the embodiment mode 1.

Embodiment 8

What is described in an embodiment 8 is a method of how the present invention is used. If the authentication of the user's identity does not need data as unique as the individual information, it might happen that the present invention is not used. It is therefore possible to select whether the authentication should be carried out or not. For example, the authentication can be selectively made carried out when a large amount of money flows. The present invention may be used corresponding to a situation of the customer and only when, in the case of presetting a criterion for judgement on the control microcomputer of the mobile information device, a numerical value exceeds the fixed value. Moreover, a result of the authentication may be transmitted via the Internet only when required.

The mobile information communication device according to the present invention is capable of authenticating the user's identity by use of the image sensor incorporated into the mobile information terminal device, and performing the authentication with a higher reliability and a more simplicity than by inputting the numerical values (password) in the prior art.

The present invention has been discussed by way of the embodiments but may be modified in many forms within the range of the gist of the present invention, and these modifications are not excluded from the scope of the present invention.

What is claimed is:

1. A user identity authentication system comprising:
   a mobile information communication device;
   a liquid crystal display device provided in said mobile information communication device, and including a pixel portion having a plurality of pixels, each of said pixels comprising:
      a pixel thin film transistor having a source region, a drain region and a gate electrode;
      a source signal line connected to the source region;
      a liquid crystal element and a storage capacitor connected to the drain region;
      a gate signal line connected to the gate electrode; and
      a capacitance line connected to the storage capacitor, and
   an image sensor built in said liquid crystal display device, said image sensor comprising:
      a first thin film transistor having a first source region, a first drain region and a first gate electrode;
      a sensor gate signal line connected to the first gate electrode;
      a sensor output wiring connected to one of the first source and drain regions;
      a second thin film transistor having a second source region, a second drain region and a second gate electrode;
      a reset gate signal line connected to the second gate electrode; and
      a sensor power source line connected to the second drain region,
   wherein said image sensor reads individual information of a user, and a user's identity is authenticated based on the individual information.

2. A user identity authentication system according to claim 1, wherein the image sensor is constructed of photo diodes provided for respective pixels.

3. A user identity authentication system according to claim 2, wherein said liquid crystal display device is a reflection type liquid crystal display device.

4. A user identity authentication system according to claim 2, wherein said mobile information communication device comprises an operation key and is configured to provide an operation of authenticating the user's identity by manipulating the operation key.

5. A user identity authentication system according to claim 4, wherein said operation key can be manipulated by only a forefinger of said user.

6. A user identity authentication system according to claim 4, wherein said operation key can be manipulated by only a thumb of said user.

7. A user identity authentication system according to claim 2, wherein an operation key on said mobile information communication device can be manipulated by only a dominant hand of an user.

8. A user identity authentication system according to claim 2, wherein said mobile information communication device comprises a power source and is configured to provide authentication of said user's identity simultaneously with switching on the power source of said mobile information communication device.

9. A user identity authentication system according to claim 2, wherein one or both of a palm print (palm lines) and/or a fingerprint comprises said individual information.

10. A user identity authentication system according to claim 2, wherein said individual information comprises one or both of a palm print of a whole palm or a part of a palm.

11. A user identity authentication system comprising:
a liquid crystal display device comprising a built-in image sensor, said liquid crystal display device having a pixel portion and a sensor portion including:
a pixel thin film transistor having a source region, a drain region and a gate electrode;
a source signal line connected to the source region;
a liquid crystal element and a storage capacitor connected to the drain region;
a gate signal line connected to the gate electrode; and
a capacitance line connected to the storage capacitor,
the built-in image sensor comprising:
a first thin film transistor having a first source region, a first drain region and a first gate electrode;
a sensor gate signal line connected to the first gate electrode;
a sensor output wiring connected to the one of the first source and drain regions;
a second thin film transistor having a second source region, a second drain region and a second gate electrode;
a reset gate signal line connected to the second gate electrode; and
a sensor power source line connected to the second drain region,
a storage device; and
a module for comparing individual information read by said image sensor with individual information stored in said storage device.

12. A user identity authentication system according to claim 11, wherein the module for comparing is configured for judging whether the user can be identified or not by comparing individual information read by said image sensor with individual information stored in said storage device.

13. A user identity authentication system according to claim 12, wherein said liquid crystal display device is a reflection type liquid crystal display device.

14. A user identity authentication system according to claim 12, wherein an operation of authenticating the user's identity is performed by manipulating an operation key on said mobile information communication device.

15. A user identity authentication system according to claim 14, wherein said operation key can be manipulated by only a forefinger of said user.

16. A user identity authentication system according to claim 14, wherein said operation key can be manipulated by only a thumb of said user.

17. A user identity authentication system according to claim 12, wherein an operation key on said mobile information communication device can be manipulated by only a dominant hand of an user.

18. A user identity authentication system according to claim 12, wherein said mobile information communication device comprises a power source and is configured to provide authentication of said user's identity simultaneously with switching on the power source of said mobile information communication device.

19. A user identity authentication system according to claim 12, wherein one or both of a palm print (palm lines) and/or a fingerprint comprises said individual information.

20. A user identity authentication system according to claim 12, wherein said individual information comprises one or both of a palm print of a whole palm or a part of a palm is used.

21. A user identity authentication system comprising:
a mobile information communication device;
a liquid crystal display device provided in said mobile information communication device, and including a pixel portion having a plurality of pixels, each of said pixels comprising:
a pixel thin film transistor having a source region, a drain region and a gate electrode;
a source signal line connected to the source region;
a liquid crystal element and a storage capacitor connected to the drain region;
a gate signal line connected to the gate electrode; and
a capacitance line connected to the storage capacitor, and
an image sensor built in said liquid crystal display device, said image sensor comprising:
a first thin film transistor having a first source region, a first drain region and a first gate electrode;
a sensor gate signal line connected to the first gate electrode;
a sensor output wiring connected to one of the first source and drain regions;
a second thin film transistor having a second source region, a second drain region and a second gate electrode;
a reset gate signal line connected to the second gate electrode; and
a sensor power source line connected to the second drain region,
wherein said image sensor reads individual information of a user, and said individual information is transmitted via the Internet.

22. A user identity authentication system of claim 21, wherein said individual information is transmitted via the Internet only when necessary, in accordance with a transmission necessity judged based on a degree of requirement set in said mobile information communication device or a destination terminal of communication.

23. A user identity authentication system according to claim 22, wherein said liquid crystal display device is a reflection type liquid crystal display device.

24. A user identity authentication system comprising:
a liquid crystal display device including a built-in image sensor, said liquid crystal display device having a pixel portion and a sensor portion including:
a pixel thin film transistor having a source region, a drain region and a gate electrode;
a source signal line connected to the source region;
a liquid crystal element and a storage capacitor connected to the drain region;

a gate signal line connected to the gate electrode; and
a capacitance line connected to the storage capacitor,
the built-in image sensor comprising:
   a first thin film transistor having a first source region, a first drain region and a first gate electrode;
   a sensor gate signal line connected to the first gate electrode;
   a sensor output wiring connected to one of the first source and drain regions;
   a second thin film transistor having a second source region, a second drain region and a second gate electrode;
   a reset gate signal line connected to the second gate electrode; and
   a sensor power source line connected to the second drain region, a storage device;
a module for judging whether the user can be identified or not by comparing individual information read by said image sensor with individual information stored in said storage device; and
a module for transmitting a result of the authentication via the Internet.

25. A user identity authentication system according to claim 24, wherein said liquid crystal display device is a reflection type liquid crystal display device.

26. A user identity authentication method using a mobile information communication device provided with a liquid crystal display device comprising a built-in image sensor, said method comprising:
   a step of reading individual information of a user with said image sensor; and
   a step of authenticating a user's identity based on said individual information,
   wherein the liquid crystal device having a first and a second front lights is capable of displaying a image and reading the individual information by the built-in image sensor, and
   wherein the first and second front lights are not lit up simultaneously, and are operated alternately corresponding to a time when displaying the image and when reading the individual information.

27. A user identity authentication method according to claim 26, wherein the image sensor comprises photo diodes provided for respective pixels.

28. A user identity authentication method according to claim 27, wherein said liquid crystal display device is a reflection type liquid crystal display device.

29. A user identity authentication method according to claim 27, further comprising authenticating the user's identity by manipulating an operation key on said mobile information communication device.

30. A user identity authentication method according to claim 27, wherein an operation key on said mobile information communication device can be controlled by only a dominant hand of said user.

31. A user identity authentication method according to claim 27, wherein said operation key can be controlled by only a forefinger of said user.

32. A user identity authentication method according to claim 27, wherein said operation key can be controlled by only a thumb of said user.

33. A user identity authentication method according to claim 27, wherein authentication of said user's identity is triggered simultaneously by switching on a power source of said mobile information communication device.

34. A user identity authentication method according to claim 27, wherein one or both of a palm print (palm lines) and/or a fingerprint comprises said individual information.

35. A user identity authentication method according to claim 27, wherein said individual information comprises one or both of a palm print of said whole palm or a part of a palm.

36. A user identity authentication method using a mobile information communication device provided with a liquid crystal display device comprising a built-in image sensor, said method comprising:
   a step of reading individual information of a user with said image sensor; and
   a step of transmitting said individual information via the Internet,
   wherein the liquid crystal device having a first and a second front lights is capable of displaying a image and reading the individual information by the built-in image sensor, and
   wherein the first and second front lights are not lit up simultaneously, and are operated alternately corresponding to a time when displaying the image and when reading the individual information.

37. A user identity authentication method according to claim 36 further comprising:
   a step of judging whether or not said individual information needs to be transmitted in accordance with a degree of requirement set in said mobile information communication device or a destination terminal of communication; and
   transmitting said individual information via the Internet only when necessary.

38. A user identity authentication method according to claim 37, wherein said liquid crystal display device is a reflection type liquid crystal display device.

39. A mobile telephonic device comprising:
   a liquid crystal display device comprising photo diodes provided for respective pixels, a flash memory, and including a pixel portion having a plurality of pixels, each of said pixels comprising:
      a pixel thin film transistor having a source region, a drain region and a gate electrode;
      a source signal line connected to the source region;
      a liquid crystal element and a storage capacitor connected to the drain region;
      a gate signal line connected to the gate electrode; and
      a capacitance line connected to the storage capacitor,
   an image sensor constructed of said photo diodes, said image sensor comprising:
      a first thin film transistor having a first source region, a first drain region and a first gate electrode;
      a sensor gate signal line connected to the first gate electrode;
      a sensor output wiring connected to one of the first source and drain regions;
      a second thin film transistor having a second source region, a second drain region and a second gate electrode;
      a reset gate signal line connected to the second gate electrode; and
      a sensor power source line connected to the second drain region, and
   a means for collating individual information read by said image sensor with user's individual information stored in said flash memory.

40. A mobile telephonic device according claim 39, wherein said liquid crystal display device is a reflection type liquid crystal display device.

* * * * *